US009432111B2

(12) United States Patent
Takano

(10) Patent No.: US 9,432,111 B2
(45) Date of Patent: *Aug. 30, 2016

(54) COMMUNICATION SYSTEM, COMMUNICATION APPARATUS, COMMUNICATION METHOD AND COMPUTER PROGRAM

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,672

(22) Filed: Sep. 10, 2014

(65) Prior Publication Data

US 2014/0376449 A1    Dec. 25, 2014

Related U.S. Application Data

(63) Continuation of application No. 13/389,617, filed as application No. PCT/JP2010/005009 on Aug. 10, 2010, now Pat. No. 8,861,425.

(30) Foreign Application Priority Data

Aug. 17, 2009  (JP) ................. 2009-188659
Jul. 1, 2010   (JP) ................. 2010-151417

(51) Int. Cl.
*H04B 7/26*   (2006.01)
*H04W 72/08*  (2009.01)
(Continued)

(52) U.S. Cl.
CPC ........ *H04B 7/2606* (2013.01); *H04B 7/15542* (2013.01); *H04L 5/0037* (2013.01); *H04L 5/0062* (2013.01); *H04L 5/0073* (2013.01);
(Continued)

(58) Field of Classification Search
USPC ......................... 370/315, 328, 338
See application file for complete search history.

(56) References Cited

U.S. PATENT DOCUMENTS 4,829,540 A   5/1989  Waggener et al.
7,477,695 B2  1/2009  Takano
(Continued)

FOREIGN PATENT DOCUMENTS

JP   2005-26816   1/2005
JP   2008-22558   1/2008
(Continued)

OTHER PUBLICATIONS

International Search Report issued on Nov. 16, 2010 in PCT/JP10/05009 filed on Aug. 10, 2010.
(Continued)

*Primary Examiner* — Mohammad Anwar
(74) *Attorney, Agent, or Firm* — Oblon, McClelland, Maier & Neustadt, L.L.P

(57) ABSTRACT

By deciding positions of frequencies used via a relay station by a system in advance for assignment of boundary frequencies, frequencies of a central frequency more likely to be affected by the relay station are also mapped by avoiding a signal thereof. Alternatively, an adjacent cell whose central frequency is affected changes depending on a position of the relay station and thus, locations set to be highly likely to interfere with the central frequency of the adjacent cell is reduced by setting a region of the boundary frequencies permitted to the relay station in accordance with the position of the relay station.

19 Claims, 23 Drawing Sheets

(51) Int. Cl.
*H04B 7/155* (2006.01)
*H04J 11/00* (2006.01)
*H04L 5/00* (2006.01)
*H04W 72/10* (2009.01)
*H04W 84/04* (2009.01)

(52) U.S. Cl.
CPC ............. *H04W 72/08* (2013.01); *H04J 11/005* (2013.01); *H04L 5/0007* (2013.01); *H04L 5/0094* (2013.01); *H04W 72/10* (2013.01); *H04W 84/047* (2013.01)

(56) References Cited

U.S. PATENT DOCUMENTS

| | | | |
|---|---|---|---|
| 7,620,114 | B2 | 11/2009 | Takano |
| 7,627,045 | B2 | 12/2009 | Takano |
| 7,680,461 | B2 | 3/2010 | Takano |
| 8,000,421 | B2 | 8/2011 | Takano et al. |
| 8,238,959 | B2 * | 8/2012 | Roh et al. ............... 455/522 |
| 8,824,355 | B2 | 9/2014 | Takano |
| 2005/0141631 | A1 | 6/2005 | Takano |
| 2008/0057934 | A1 | 3/2008 | Sung et al. |
| 2008/0070510 | A1 * | 3/2008 | Doppler et al. .......... 455/69 |
| 2008/0081626 | A1 * | 4/2008 | Choi et al. ............... 455/442 |
| 2008/0095037 | A1 | 4/2008 | Chang et al. |
| 2008/0233967 | A1 * | 9/2008 | Montojo et al. ......... 455/452.2 |
| 2008/0247340 | A1 | 10/2008 | Choi et al. |
| 2009/0059819 | A1 | 3/2009 | Choi et al. |
| 2009/0129401 | A1 * | 5/2009 | Kang et al. ............... 370/431 |
| 2009/0181666 | A1 | 7/2009 | Viswanath |
| 2010/0291935 | A1 * | 11/2010 | Rudrapatna et al. ......... 455/450 |
| 2012/0052796 | A1 | 3/2012 | Takano |
| 2012/0176927 | A1 | 7/2012 | Takano |

FOREIGN PATENT DOCUMENTS

| | | |
|---|---|---|
| JP | 2008-61250 | 3/2008 |
| WO | WO 2011-018892 A1 | 2/2011 |

OTHER PUBLICATIONS

U.S. Appl. No. 14/615,209, filed Feb. 5, 2015, Takano.
Extended European search report dated Nov. 27, 2015 in EP Application No. 10 80 9712.2.
Office Action in EPO Application Serial No. 10 809 712.2—1851, dated Jun. 10, 2016.

* cited by examiner

COMMUNICATION SYSTEM, COMMUNICATION APPARATUS, COMMUNICATION METHOD AND COMPUTER PROGRAM

CROSS-REFERENCE TO RELATED APPLICATIONS

The present application is a continuation application of and claims the benefit of priority under 35 U.S.C. §120 from U.S. application Ser. No. 13/389,617, filed Feb. 9, 2012, the entire contents of which is incorporated herein by reference; and which is a national stage of International Application No. PCT/JP2010/005009, filed Aug. 10, 2010, which is based upon and claims the benefit of priority under 35 U.S.C. §119 from prior Japanese Patent Applications No. 2009-188659, filed Aug. 17, 2009 and No. 2010-151417, filed Jul. 1, 2010.

TECHNICAL FIELD

The present invention relates to a communication system, a communication apparatus, a communication method and a computer program in which a base station communications with a mobile station within a cell through the mediation of a relay station. In particular, the present invention relates to a communication system, a communication apparatus, a communication method and a computer program which employ a relay mode that applies intercell interference coordination.

BACKGROUND ART

Communication services become increasingly diverse with widespread use of information processing and information communication technology and in particular, development of mobile communication such as mobile phone is remarkable. Currently, 3GPP (Third Generation Partnership Project) is working on standardization of the world standard "IMT (International Mobile Telecommunications)—2000" of a third-generation (3G) mobile communication system drafted by ITU (International Telecommunication Union). "LTE (Long Term Evolution)", which is one of data communication specifications drafted by 3GPP, is a long-term advanced system aimed at fourth-generation (4G) IMT-Advanced and is also called "3.9G (super 3G)".

LTE is a communication mode based on an OFDM modulation method and adopts OFDMA as the radio access method of a downlink. OFDM (Orthogonal Frequency Division Multiplexing) is a multi-carrier method by which a plurality of pieces of data is assigned to frequency sub-carriers that are "orthogonal", that is, do not interfere with each other and can convert each sub-carrier on a frequency axis into a signal on a time axis for transmission by performing inverse FFT (Fast Fourier Transform) for each sub-carrier. Transmission data is transmitted by being distributed to a plurality of carriers whose frequencies are orthogonal and thus, OFDM is characterized in that the band of each carrier becomes a narrow band, the efficiency of frequency utilization is very high, and delay distortion (frequency selective fading disturbance) is resisted thanks to multi paths. OFDMA (Orthogonal Frequency Division Multiple Access) is a multiple access scheme in which, instead of all sub-carriers of an OFDM signal being occupied by one communicating station, a set of sub-carriers in the frequency axis is assigned to a plurality of communicating stations so that sub-carriers are shared by the plurality of communicating stations. If a plurality of users each use different sub-carriers or different time slots (that is, division multiplexing in a frequency direction and a time direction), communication can be performed without interference.

3GPP supports a bandwidth close to 100 MHz in a standard specification "LTE-Advanced", which is a further development of LTE for a fourth-generation mobile communication system, and aims for realization of the peak speed of 1 Gbps at the maximum. A space division multiple access scheme in which radio resources on spatial axes are shared by a plurality of users like, for example, multi-user MIMO (MU-MIMO) or SDMA (Space Division Multiple Access) is regarded as very likely.

Moreover, relay technology is examined for LTE-Advanced to improve throughput at cell edges. The relay technology here is a mechanism by which a relay station (RS) is installed in an area (cell) of a base station connected to a core network to allow hopping communication between the base station and the relay station. If the communication speed is 1-2 Mbps or so, the modulation method such as BPSK (Binary Phase Shift Keying) and QPSK (Quadrature PSK) can be applied and a necessary SNR (Signal-to-Noise Ratio) is permitted even if the SNR is low at cell edges. In contrast, to obtain the communication speed of 100 Mbps or more, it is necessary to maintain the SNR high throughout the cell. Moreover, a higher operating frequency increases transmission losses and is sensitive to fading so that a coverage area of a base station deteriorates. Performance of a single base station falls at cell edges and a relay station compensates therefor.

In a downlink, a relay station amplifies a received signal from a base station and then transmits the received signal to a mobile station. With a signal being relayed, the SNR can be made larger when compared with a case when the signal is directly transmitted from the base station to the mobile station. In an uplink, on the other hand, the relay station can maintain the SNR high by receiving a signal from the mobile station and transmitting the signal to the base station (downbound radio access from a base station (BS) toward a mobile station (MS) is called herein as a "downlink" and up-bound radio access from the MS to the BS as an "uplink").

For example, a cellular system in which a base station assigns resources to terminals, transmits a downlink signal in the current time slot, and receives an uplink signal from terminals via a relay station in the next time slot, the relay station receives a downlink signal from the base station and an uplink signal from terminals in the current time slot and transmits the received downlink signal to the terminals and the received uplink signal to the base station in the next time slot, and the terminal transmits an uplink signal in the current time slot and receives a downlink signal via the relay station in the next time slot (see, for example, Japanese Patent Application Laid-Open No. 2008-22558).

The mode in which a relay station relays a signal between a base station and a mobile station can be classified into the following two types based on how a received signal is transmitted.

The first type is a mode called "Amplify-and-Forward (AF)" in which a relay station retransmits a received signal from a base station after amplifying the signal unchanged as an analog signal. In the AF mode, it is difficult for the mobile station to improve the SNR and thus, it is necessary for the relay station to relay by using a region in which signal strength is sufficiently large. Moreover, there is a feedback path between a transmitting antenna and a receiving antenna so that consideration must be given to prevention of oscillation. An advantage of the AF mode is that there is no need at all to improve the communication protocol.

The second type is a mode called "Decode-and-Forward (DF)" in which the relay station performs digital processing on a received signal from the base station and then amplifies and transmits the received signal. That is, the relay station converts the received signal from the base station into a digital signal by the AD conversion, performs decode processing such as an error correction on the signal, encodes the signal again, and converts the signal into an analog signal by the DA conversion before amplifying and transmitting the signal. According to the DF mode, the SNR can be improved by a coding gain. Further, an issue of a signal turnaround into between the transmitting antenna and the receiving antenna can be avoided by a signal converted into a digital signal being stored in a memory and the signal being transmitted in the next time slot by the relay station. Oscillation can also be suppressed by changing the frequency, instead of the time slot being changed for transmission and reception.

In LTE-Advanced, which is a future network of 3GPP, the DF mode capable of improving the SNR rather than the AF mode is more likely to be mainstream.

In LTE and LTE-Advanced, a reduction in communication delay is demanded and more specifically, reducing the delay between users to 50 millisecond or less is demanded. Thus, when relay technology is introduced, an issue of delay caused by the mediation of a relay station needs to be sufficiently considered.

While the DF-type relay mode improves the SNR by a coding gain, a delay caused by decoding and recoding is significant. Thus, a method by which the AF type that causes less delay is used for channels in which a delay demand is severe and the DF type is applied to channels in which a delay demand is not severe is proposed.

If relayed in the DF type relay mode by changing the time slot by time division to avoid interference, the delay increases in time slot. The delay when a relay station recodes and transmits a received signal is frequently aligned with a delay of one subframe or time slot. This is because if a relay station should be introduced while maintaining downward compatibility of LTE, such delimitation is easier to maintain compatibility. One subframe is a delimiter of an uplink and a downlink of TDD and thus is easier to adopt as the unit of delay of a relay station.

In LTE, intercell interference coordination (ICIC) is proposed to reduce an influence of interference between adjacent cells of the same channel.

The ICIC can be realized by, for example, a fractional frequency repetition combining a one-cell frequency repetition and a multi-cell frequency repetition.

Each cell is divided into a center region inside the cell close to a base station and a boundary region at cell ends apart from the base station. While a "central frequency" assigned to communication between the base station and the mobile station in the center region competes with that of adjacent cells (that is, a one-cell frequency repetition), interference between cells is avoided by controlling transmission power small enough so that a signal reaches only within a center region. On the other hand, it is necessary to transmit a signal large enough so that the signal reaches the boundary region and interference between cells is avoided by mutually different "boundary frequencies" being used by boundary regions of adjacent cells (that is, a multi-cell frequency repetition). Moreover, instead of all sub-carriers of an OFDM signal being occupied by one mobile station, sub-carriers of the central frequency are assigned to mobile stations near the base station and those of boundary frequencies to mobile stations apart from the base station so that sub-carriers are shared by a plurality of mobile stations to implement multiple access (OFDMA).

If, however, the relay technology is introduced into a cellular system in which the ICIC is adopted, there is the possibility that a signal retransmitted from the relay station may interfere with adjacent cells. This is because while the relay technology improves throughput at cell edges through the mediation of the relay station, the introduction thereof is equivalent to increasing power in the vicinity of cell edges. The relay station is, when compared with the base station, closer to cell edges, which increases the possibility of interfering with the central frequency of adjacent cells. Conversely, the possibility of the relay station being interfered with by the central frequency of adjacent cells also increases.

Even if the base station transmits a signal of the boundary frequency with strong power, interference with the central frequency of adjacent cells is small because the strong power sufficiently attenuates at cell edges. In contrast, the relay station transmits the boundary frequency closer to cell edges and thus, it is extremely likely that reception of mobile stations using the central frequency of adjacent cells is interfered with.

On the other hand, while the base station receives a signal using the boundary frequency from a mobile station in the boundary region, interference with the central frequency of adjacent cells is small. This is because base stations of adjacent cells and the base station of the local cell are sufficiently apart from each other and the base station controls transmission power at the central frequency to a low level. Reception of relay stations located in the boundary region is similarly considered to be without issues.

In short, if relay technology is introduced into a cellular system, a mobile station located in the boundary region uses the boundary frequency of the local cell, which is to be the central frequency of adjacent cells and therefore, an issue is considered to arise in reception of the mobile station.

CITATION LIST

Patent Literature

[PTL 1]
Japanese Patent Application Laid-Open No. 2008-22558

SUMMARY OF INVENTION

Technical Problem

Thus, it is desirable to provide a communication system, a communication apparatus, a communication method and a computer program which are superior, and in which a base station can suitably communicate with a mobile station in a cell through the mediation of a relay station.

It is also desirable to provide a communication system, a communication apparatus, a communication method and a computer program which employ a superior relay mode capable of suitably performing intercell interference coordination.

It is also desirable to provide a superior communication system, a communication apparatus, a communication method, and a computer program which are capable of suitably solving issues of interference of adjacent cells involved in the introduction of relay technology while applying intercell interference coordination.

Solution to Problem

According to an embodiment of the present invention, there is provided a communication system, including a first cell and a second cell adjacent to each other, each of which permitted to install a relay station to relay between a base station and a mobile station. An assignment to the relay station in the first cell may be restricted to restricted bands on the first cell side and a frequency to the mobile station in the second cell may be assigned by avoiding the restricted bands or lowering a degree of priority on the second cell side.

However, the "system" here indicates a thing in which a plurality of apparatuses (or a functional module realizing a specific function) is logically assembled and it does not matter whether each apparatus or functional module is located in a single cabinet (same also below).

According to another embodiment of the present invention, there is provided a communication system, including a first cell and a second cell adjacent to each other, each of which composed of a center region inside the cell using a central frequency and a boundary region at cell ends using boundary frequencies by a multi-cell frequency repetition and permitted to install a relay station to relay between a base station and a mobile station. An assignment to the relay station of the boundary frequencies of the first cell may be restricted to restricted bands on the first cell side and the central frequency of the second cell may be assigned to the mobile station by avoiding the restricted bands or lowering a degree of priority on the second cell side.

A frequency hopping may be allowed for frequency assignment to the relay station over time on the first cell side.

According to another embodiment of the present invention, there is provided a communication apparatus operating as a base station in a communication system that is constituted by the base station managing radio resources in a local cell composed of an internal center region and a boundary region at edges, a mobile station, and a relay station relaying between the base station and the mobile station belonging to the relay station. The communication apparatus may include a relay station frequency assignment decision unit that decides a restricted band of boundary frequencies to be assigned to the relay station, a notification unit that notifies the base station of an adjacent cell of the restricted band decided by the relay station frequency assignment decision unit, and a scheduler that schedules radio resources in the local cell conforming to the restricted band decided by the relay station frequency assignment decision unit.

The scheduler in the communication apparatus may allow frequency hopping for frequency assignment to the relay station over time.

The scheduler in the communication apparatus may assign, when the restricted band is notified from the adjacent cell, a central frequency of the local cell by avoiding the restricted band of the adjacent cell or lowering an order of priority thereof.

According to another embodiment of the present invention, there is provided a communication method for operating as a base station in a communication system constituted by the base station managing radio resources in a local cell composed of an internal center region and a boundary region at edges, a mobile station, and a relay station relaying between the base station and the mobile station belonging to the relay station. The communication method includes the steps of deciding a restricted band of boundary frequencies to be assigned to the relay station, notifying the base station of an adjacent cell of the restricted band decided in the relay station frequency assignment decision step, scheduling radio resources in the local cell conforming to the restricted band decided in the relay station frequency assignment decision step, and assigning a central frequency of the local cell by avoiding the restricted band of the adjacent cell or lowering an order of priority thereof when the restricted band is notified from the adjacent cell.

According to another embodiment of the present invention, there is provided a computer program causing a computer to execute a processing operation as a base station in a communication system constituted by the base station managing radio resources in a local cell composed of an internal center region and a boundary region at edges, a mobile station, and a relay station relaying between the base station and the mobile station belonging to the relay station. The computer program causes the computer to function as a relay station frequency assignment decision unit that decides a restricted band of boundary frequencies to be assigned to the relay station, a notification unit that notifies the base station of an adjacent cell of the restricted band decided by the relay station frequency assignment decision unit, and a scheduler that schedules radio resources in the local cell conforming to the restricted band decided by the relay station frequency assignment decision unit and, when the restricted band is notified from the adjacent cell, assigns a central frequency of the local cell by avoiding the restricted band of the adjacent cell or lowering an order of priority thereof.

The computer program may define a computer program written in a computer-readable form to realize predetermined processing on a computer. In other words, by installing the computer program on a computer, a collaborative operation may be exercised on the computer so that an operation effect similar to that of the communication apparatus according to the invention of the present application can be achieved.

Further, according to another embodiment of the present invention, there is provided a communication apparatus operating as a relay station in a communication system constituted by a base station managing radio resources in a local cell composed of an internal center region and a boundary region at edges, a mobile station, and the relay station relaying between the base station and the mobile station belonging to the relay station, including a communication unit to perform transmission/reception with the base station and the mobile station, a buffer that temporarily holds data to be relayed between the base station and the mobile station, a scheduling information holding memory that stores scheduling information notified from the base station, and a control unit that controls communication operations by the communication unit including a relay operation between the base station and the mobile station based on the scheduling information. The communication unit may transmit a radio signal by using a restricted band of boundary frequencies assigned to the relay station such that use as a central frequency in an adjacent cell is restricted.

Further, according to another embodiment of the present invention, there is provided a communication apparatus operating as a mobile station in a communication system constituted by a base station managing radio resources in a local cell composed of an internal center region and a boundary region at edges, the mobile station, and a relay station relaying between the base station and the mobile station belonging to the relay station, including a communication unit to perform transmission/reception with the base station and the relay station, a scheduling information holding memory that stores scheduling information notified from the base station and a control unit that controls communication operations by the communication unit based on the scheduling information. The communication unit may receive a radio signal using a restricted band of boundary frequencies assigned to the relay station such that use as a central frequency in an adjacent cell is restricted.

Further, according to another embodiment of the present invention, there is provided a communication system, including a first cell and a second cell adjacent to each other, each of which composed of a center region inside the cell using a central frequency and a boundary region at cell ends using boundary frequencies by a multi-cell frequency repetition and permitted to install a relay station to relay between a base station and a mobile station. Non-interference bands of the central frequency of the second cell that should not be interfered with may be decided on the second cell side and an assignment of the non-interference bands of the boundary frequencies of the first cell to the relay station may be prohibited on the first cell side.

Further, according to another embodiment of the present invention, there is provided a communication apparatus operating as a base station in a communication system constituted by the base station managing radio resources in a local cell composed of an internal center region and a boundary region at edges, a mobile station, and a relay station relaying between the base station and the mobile station belonging to the relay station, including a relay station frequency assignment decision unit that decides a non-interference band of a central frequency that should not be interfered with, a notification unit that notifies the base station of an adjacent cell of the non-interference band decided by the relay station frequency assignment decision unit, and a scheduler that schedules radio resources in the local cell, when the non-interference band is notified from the adjacent cell, by avoiding the non-interference band of boundary frequencies of the adjacent cell.

Further, according to another embodiment of the present invention, there is provided a communication method for operating as a base station in a communication system constituted by the base station managing radio resources in a local cell composed of an internal center region and a boundary region at edges, a mobile station, and a relay station relaying between the base station and the mobile station belonging to the relay station, including the steps of deciding a non-interference band of a central frequency that should not be interfered with, notifying the base station of an adjacent cell of the non-interference band decided in the relay station frequency assignment decision step, and scheduling radio resources in the local cell, when the non-interference band is notified from the adjacent cell, by avoiding the non-interference band of boundary frequencies of the adjacent cell.

Further, according to another embodiment of the present invention, there is provided a computer program causing a computer to execute a processing operation as a base station in a communication system constituted by the base station managing radio resources in a local cell composed of an internal center region and a boundary region at edges, a mobile station, and a relay station relaying between the base station and the mobile station belonging to the relay station, the computer caused to function as a relay station frequency assignment decision unit that decides a non-interference band of a central frequency that should not be interfered with, a notification unit that notifies the base station of an adjacent cell of the non-interference band decided by the relay station frequency assignment decision unit, and a scheduler that schedules radio resources in the local cell, when the non-interference band is notified from the adjacent cell, by avoiding the non-interference band of boundary frequencies of the adjacent cell.

The computer program may define a computer program written in a computer-readable form to realize predetermined processing on a computer. In other words, by installing the computer program according to the present invention on a computer, a collaborative operation is exercised on the computer so that an operation effect similar to that of the communication apparatus according to the invention of the present application can be achieved.

Further, according to another embodiment of the present invention, there is provided a communication apparatus operating as a relay station in a communication system constituted by a base station managing radio resources in a local cell composed of an internal center region and a boundary region at edges, a mobile station, and the relay station relaying between the base station and the mobile station belonging to the relay station including a communication unit to perform transmission/reception with the base station and the mobile station, a buffer that temporarily holds data to be relayed between the base station and the mobile station, a scheduling information holding memory that stores scheduling information notified from the base station, and a control unit that controls communication operations by the communication unit including a relay operation between the base station and the mobile station based on the scheduling information. The communication unit may transmit a radio signal by using a frequency band assigned to the relay station from among boundary frequencies such that a non-interference band of a central frequency of an adjacent cell is avoided.

Further, according to another embodiment of the present invention, there is provided a communication apparatus operating as a mobile station in a communication system constituted by a base station managing radio resources in a local cell composed of an internal center region and a boundary region at edges, the mobile station, and a relay station relaying between the base station and the mobile station belonging to the relay station, including a communication unit to perform transmission/reception with the base station and the relay station, a scheduling information holding memory that stores scheduling information notified from the base station, and a control unit that controls communication operations by the communication unit based on the scheduling information. The communication unit may receive a radio signal using a frequency band assigned to the relay station from among boundary frequencies such that a non-interference band of a central frequency of an adjacent cell is avoided.

Further, according to another embodiment of the present invention, there is provided a communication system, including a plurality of cells, each of which composed of a center region inside the cell using a central frequency and a boundary region at cell ends using boundary frequencies by a multi-cell frequency repetition and permitted to install a relay station to relay between a base station and a mobile station. At least in one local cell, a frequency from among the boundary frequencies of the local cell may be assigned to the relay station in the boundary region of the local cell while avoiding bands that become interference components to the central frequency of an adjacent cell near an installation location of the relay station.

Further, according to another embodiment of the present invention, the communication system determines, in a group of plurality of cells which assigns common boundary frequencies, among those which are central frequencies of common adjacent cells and the common boundary frequencies, a common boundary frequency to be assigned to a relay station that is arranged close to the common adjacent cells.

Further, according to another embodiment of the present invention, there is provided a communication apparatus operating as a base station in a communication system constituted by the base station managing radio resources in a local cell composed of an internal center region and a boundary region at edges, a mobile station, and a relay station relaying between the base station and the mobile station belonging to the relay station, including a position information holding memory that stores position information of each relay station belonging to the local cell and position information of adjacent cells, a relay station frequency assignment decision unit that estimates the adjacent cell close to the relay station based on the position information stored in the position information holding memory and decides a given interference band used by the relay station from among boundary frequencies of the local cell while avoiding a region highly likely to interfere with a central frequency of the adjacent cell, a notification unit that notifies the adjacent cell of information about the given interference band decided by the relay station frequency assignment decision unit, and a scheduler that assigns the frequency from among the boundary frequencies of the local cell to the relay station in the boundary region of the local cell while avoiding bands that become interference components to the central frequency of an adjacent cell near an installation location of the relay station and also assigns the central frequency of the local cell while avoiding the given interference band notified from the adjacent cell.

Further, according to another embodiment of the present invention, there is provided a communication method for operating as a base station in a communication system constituted by the base station managing radio resources in a local cell composed of an internal center region and a boundary region at edges, a mobile station, and a relay station relaying between the base station and the mobile station belonging to the relay station, including the steps of acquiring position information of each relay station belonging to the local cell and position information of adjacent cells, estimating the adjacent cell close to the relay station based on the position information and deciding a given interference band used by the relay station from among boundary frequencies of the local cell while avoiding a region highly likely to interfere with a central frequency of the adjacent cell, notifying the adjacent cell of information about the given interference band decided in the relay station frequency assignment decision step, and assigning the frequency from among the boundary frequencies of the local cell to the relay station in the boundary region of the local cell while avoiding bands that become interference components to the central frequency of an adjacent cell near an installation location of the relay station and also assigning the central frequency of the local cell while avoiding the given interference band notified from the adjacent cell.

Further, according to another embodiment of the present invention, there is provided a computer program causing a computer to execute a processing operation as a base station in a communication system constituted by the base station managing radio resources in a local cell composed of an internal center region and a boundary region at edges, a mobile station, and a relay station relaying between the base station and the mobile station belonging to the relay station, the computer caused to function as a position information holding memory that stores position information of each relay station belonging to the local cell and position information of adjacent cells, a relay station frequency assignment decision unit that estimates the adjacent cell close to the relay station based on the position information stored in the position information holding memory and decides a given interference band used by the relay station from among boundary frequencies of the local cell while avoiding a region highly likely to interfere with a central frequency of the adjacent cell, a notification unit that notifies the adjacent cell of information about the given interference band decided by the relay station frequency assignment decision unit, and a scheduler that assigns the frequency from among the boundary frequencies of the local cell to the relay station in the boundary region of the local cell while avoiding bands that become interference components to the central frequency of an adjacent cell near an installation location of the relay station and also assigns the central frequency of the local cell while avoiding the given interference band notified from the adjacent cell.

The computer program may define a computer program written in a computer-readable form to realize predetermined processing on a computer. In other words, by installing the computer program on a computer, a collaborative operation is exercised on the computer so that an operation effect similar to that of the communication apparatus according to the invention of the present application can be achieved.

Further, according to another embodiment of the present invention, there is provided a communication apparatus operating as a relay station in a communication system constituted by a base station managing radio resources in a local cell composed of an internal center region and a boundary region at edges, a mobile station, and the relay station relaying between the base station and the mobile station belonging to the relay station, including a communication unit to perform transmission/reception with the base station and the mobile station, a buffer that temporarily holds data to be relayed between the base station and the mobile station, a scheduling information holding memory that stores scheduling information notified from the base station, and a control unit that controls communication operations by the communication unit including a relay operation between the base station and the mobile station based on the scheduling information. The communication unit may transmit a radio signal by using a frequency band assigned to the relay station from among boundary frequencies such that bands that become interference components to a central frequency of an adjacent cell near an installation location of the relay station is avoided.

Further, according to another embodiment of the present invention, there is provide a communication apparatus operating as a mobile station in a communication system constituted by a base station managing radio resources in a local cell composed of an internal center region and a boundary region at edges, the mobile station, and a relay station relaying between the base station and the mobile station belonging to the relay station, including a communication unit to perform transmission/reception with the base station and the relay station, a scheduling information holding memory that stores scheduling information notified from the base station, and a control unit that controls communication operations by the communication unit based on the scheduling information. The communication unit receives a radio signal using a frequency band assigned to the relay station from among boundary frequencies such that bands that become interference components to a central frequency of an adjacent cell near an installation location of the relay station is avoided.

Further, according to another embodiment of the present invention, there is provided a communication apparatus operating as a base station in a communication system constituted by the base station managing radio resources in a local cell composed of an internal center region and a boundary region at edges, a mobile station, and a relay station relaying between the base station and the mobile station belonging to the relay station, including a position information holding memory that stores position information of each relay station belonging to the local cell and position information of adjacent cells, a frequency information holding memory that stores boundary frequencies used by the local cell and boundary frequencies of each cell adjacent to the local cell, a relay station frequency assignment decision unit that estimates the adjacent cell close to the relay station based on the position information stored in the position information holding memory and fetches the boundary frequencies of the local cell and the adjacent cell stored in the frequency information holding memory to assign, to the relay station, the boundary frequencies to be common in a group of cells that assigns a common boundary frequency in a group of plurality of cells which assigns common boundary frequency, among those which are central frequency of common adjacent cells and the common boundary frequency, a common boundary frequency to be assigned to a relay station that is arranged close to the common adjacent cells, and a scheduler that schedules a central frequency of the local cell while conforming to a region assigned to the relay station by the relay station frequency assignment decision unit and avoiding a given interference band commonly assigned to the relay station arranged close to the local cell in a group of the adjacent cells that assign the common boundary frequency.

Further, according to another embodiment of the present invention, there is provided a communication method for operating as a base station in a communication system constituted by the base station managing radio resources in a local cell composed of an internal center region and a boundary region at edges, a mobile station, and a relay station relaying between the base station and the mobile station belonging to the relay station, including the steps of storing position information of each relay station belonging to the local cell and position information of adjacent cells, storing boundary frequencies used by the local cell and boundary frequencies of each cell adjacent to the local cell, estimating the adjacent cell close to the relay station based on the position information and also identifying the boundary frequencies of the adjacent cell to assign, to the relay station, the boundary frequencies to be common in a group of cells that assigns a common boundary frequency in a group of plurality of cells which assigns common boundary frequency, among those which are central frequency of common adjacent cells and the common boundary frequency, a common boundary frequency to be assigned to a relay station that is arranged close to the common adjacent cells, and scheduling a central frequency of the local cell while conforming to a region assigned to the relay station in the relay station frequency assignment decision step and avoiding a given interference band commonly assigned to the relay station arranged close to the local cell in a group of the adjacent cells that assign the common boundary frequency.

Further, according to another embodiment of the present invention, there is provided a computer program causing a computer to execute a processing operation as a base station in a communication system constituted by the base station managing radio resources in a local cell composed of an internal center region and a boundary region at edges, a mobile station, and a relay station relaying between the base station and the mobile station belonging to the relay station, the computer caused to function as a position information holding memory that stores position information of each relay station belonging to the local cell and position information of adjacent cells, a frequency information holding memory that stores boundary frequencies used by the local cell and boundary frequencies of each cell adjacent to the local cell, a relay station frequency assignment decision unit that estimates the adjacent cell close to the relay station based on the position information stored in the position information holding memory and fetches the boundary frequencies of the local cell and the adjacent cell stored in the frequency information holding memory to assign, to the relay station, the boundary frequencies to be common in a group of cells that assigns a common boundary frequency in a group of plurality of cells which assigns common boundary frequency, among those which are central frequency of common adjacent cells and the common boundary frequency, a common boundary frequency to be assigned to a relay station that is arranged close to the common adjacent cells, and a scheduler that schedules a central frequency of the local cell while conforming to a region assigned to the relay station by the relay station frequency assignment decision unit and avoiding a given interference band commonly assigned to the relay station arranged close to the local cell in a group of the adjacent cells that assign the common boundary frequency.

The computer program may define a computer program written in a computer-readable form to realize predetermined processing on a computer. In other words, by installing the computer program on a computer, a collaborative operation is exercised on the computer so that an operation effect similar to that of the communication apparatus according to the invention of the present application can be achieved.

Further, according to another embodiment of the present invention, there is provided a communication apparatus operating as a relay station in a communication system constituted by a base station managing radio resources in a local cell composed of an internal center region and a boundary region at edges, a mobile station, and the relay station relaying between the base station and the mobile station belonging to the relay station, including a communication unit to perform transmission/reception with the base station and the mobile station, a buffer that temporarily holds data to be relayed between the base station and the mobile station, a scheduling information holding memory that stores scheduling information notified from the base station, and a control unit that controls communication operations by the communication unit including a relay operation between the base station and the mobile station based on the scheduling information. The communication unit may transmit a radio signal by using a frequency to be common in a group of cells that assign a common boundary frequency to the boundary region among those which are central frequencies of adjacent cells close to the local station and the boundary frequencies of the local cell.

Further, according to another embodiment of the present invention, there is provided a communication apparatus operating as a mobile station in a communication system constituted by a base station managing radio resources in a local cell composed of an internal center region and a boundary region at edges, the mobile station, and a relay station relaying between the base station and the mobile station belonging to the relay station, including a communication unit to perform transmission/reception with the base station and the relay station, a scheduling information holding memory that stores scheduling information notified from the base station, and a control unit that controls communication operations by the communication unit based on the scheduling information. The communication unit receives a radio signal using a frequency to be common in a group of cells that assign a common boundary frequency to the boundary region among those which are central frequencies of adjacent cells close to the local station and the boundary frequencies of the local cell.

Advantageous Effects of Invention

According to the embodiments of present invention described above, it is possible to provide a communication system, a communication apparatus, a communication method, and a computer program which employ a superior relay mode capable of suitably performing intercell interference coordination.

Further, according to the embodiments of present invention described above, it is possible provide a communication system, a communication apparatus, a communication method and a computer program which are superior and capable of suitably solving issues of interference of adjacent cells involved in the introduction of relay technology while applying a fractional frequency repetition as intercell interference coordination.

Interference with the central frequency of an adjacent cell by a signal of the boundary frequency transmitted from a relay station can be adjusted so that improvement of the efficiency of frequency utilization can be realized, contributing to improvement of throughput for the user.

Interference with the central frequency of an adjacent cell by a signal of the boundary frequency transmitted from a relay station can be adjusted by restricting frequency bands assigned to the relay station in the cell. The first cell restrict assignment of the boundary frequencies of the first cell to the relay station to restricted bands and thus, the adjacent second cell can adjust interference suffered by the central frequency of the second cell by avoiding restricted bands or lowering a degree of priority. Moreover, the second cell decides non-interference bands of the central frequency of the second cell that should not be interfered with and the first cell correspondingly prohibits assignment of the non-interference bands of the boundary frequency of the first cell to relay stations, so that interference suffered by the central frequency in the second cell can be adjusted.

By allowing frequency hopping for frequency assignment to relay stations in a local cell over time, the degree of interference with the central frequency of adjacent cells can be equalized.

Interference with the central frequency of an adjacent cell by a signal of the boundary frequency transmitted from a relay station can be adjusted by assigning frequency bands in accordance with the position of the relay station, contributing to improvement of throughput for the user.

In a cellular system in which a fractional frequency repetition is applied, a cell can be divided into as many groups as the number of repetition frequencies in accordance with boundary frequencies. If the frequency decided based on a relation between boundary frequencies of some focused cell and those of the local cell is assigned to a relay station near the focused cell in each of a plurality of adjacent cells adjacent to the focused cell, the boundary frequency assigned to a relay station near the focused cell in each adjacent cell becomes common in each group. Thus, an influence of each adjacent cell on the central frequency of the focused cell can be made limited so that frequency utilization becomes more efficient.

Other purposes, features, and advantages of the present invention will become evident by a detailed description based on embodiments of the present invention described below or appended drawings.

DESCRIPTION OF EMBODIMENTS

An embodiment in which the present invention is applied to a mobile communication system such as LTE will be described in detail with reference to drawings.

Figure 1:
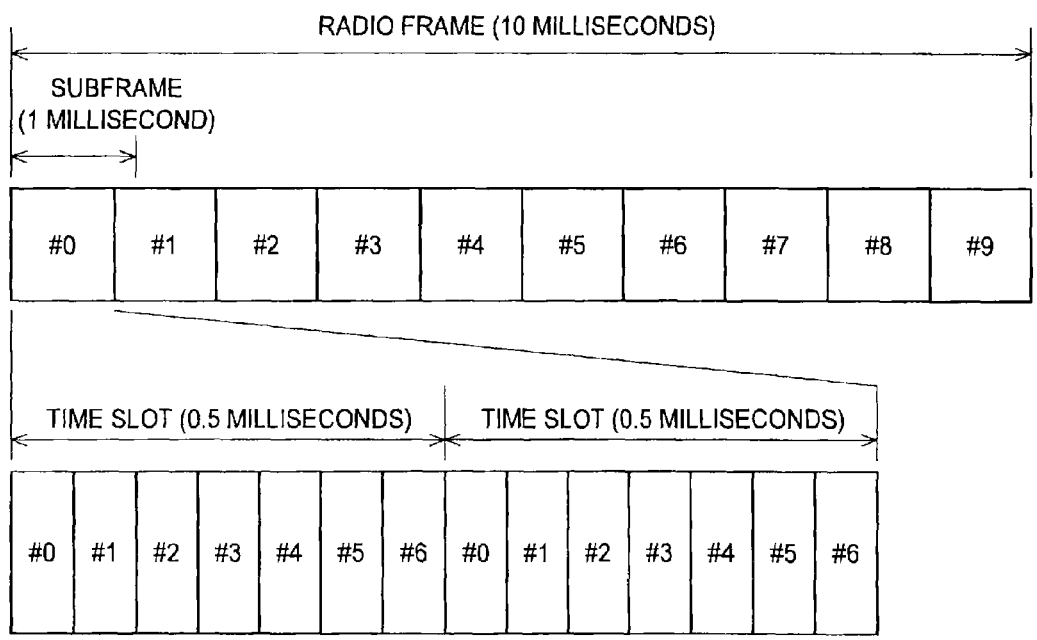
FIG. 1 is a diagram showing a radio frame configuration of a downlink of LTE.

FIG. 1 shows a radio frame configuration of a downlink of LTE. As illustrated in FIG. 1, a radio frame is composed of three hierarchical layers of a time slot (Slot), a subframe (Subframe), and a radio frame (Radio Frame) in descending order of time unit.

A time slot of 0.5 millisecond is constituted by seven OFDM symbols (for normal unicast transmission) and becomes the unit of decode processing when received by a user (mobile station). A subframe of 1 millisecond is constituted by two consecutive time slots and becomes the unit of transmission time of a correction-coded data packet. A radio frame of 10 millisecond is constituted by 10 consecutive subframes (that is, 20 time slots) and becomes the basic unit for multiplexing of all physical channels.

Each user can perform communication without mutual interference by using different subcarriers or different time slots. In LTE, the minimum unit of radio resource assignment called a "resource block (RB)" is defined by dividing continuous subcarriers into blocks. A scheduler mounted on a base station assigns radio resources to each user in resource blocks. A resource block is composed of 12 subcarriers multiplied by 1 time slot (7 OFDM symbols=0.5 millisecond). Up to 3 OFDM symbols from the head of a subframe are used as a control channel called "L1/L2 control signaling". The scheduler of a base station can assign resource blocks for each subframe, that is, at intervals of 1 millisecond. Position information of resource blocks is called scheduling. Scheduling information of uplinks and that of downlinks are both written into a control channel downlinks. Each user can recognize resource blocks assigned to the user by viewing the control channel.

The time slot of 0.5 millisecond length is the minimum unit of assignment available to each user. The scheduler mounted on a base station assigns time slots that may be used in units of time slots to each user. In LTE, two duplex systems, FDD (Frequency Division Duplex) and TDD (Time Division Duplex), can be selected. In the case of TDD, which of an uplink and a downlink to use can be selected for each subframe.

In a communication system according to the present embodiment, relay technology is introduced for the purpose of improving throughput at cell edges.

Figure 2:
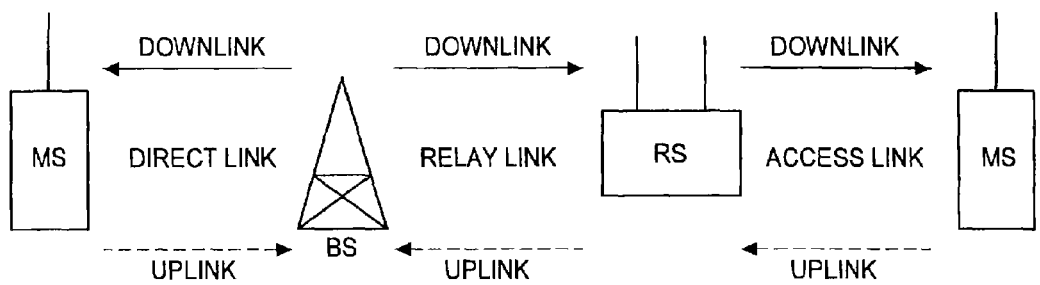
FIG. 2 is a diagram showing a basic communication operation inside a cell including cases when a relay station mediates and does not mediate.

Basic communication operations within a cell including cases when a relay station mediates and does not mediate will be described with reference to FIG. 2. A link between a base station (BS) and a relay station (RS) is called a "relay link (RelayLink)" and a link between the relay station and a mobile station (MS) is called an "access link (AccessLink)". A direct link between the base station and the mobile station without using the relay station is called a "direct link (DirectLink)". In FIG. 2, a downlink is denoted as a solid line arrow and an uplink as a broken line arrow.

In LTE, radio resources are assigned in resource blocks and specified by a control channel called the L1/L2 signaling (mentioned above). A relay station judges whether there is any resource block addressed to the relay station by viewing assignment information of resource blocks in the control channel, that is, scheduling information every 1 millisecond.

In a downlink, the relay station first amplifies a received signal from a base station by, for example, the DF mode (mentioned above) and then transmits the received signal to a mobile station. With a received signal being relayed by a relay station, the SNR can be increased when compared with a case when a signal is directly transmitted from a base station to a mobile station. In an uplink, on the other hand, the relay station can maintain the SNR high by receiving a signal from the mobile station and transmitting the signal to the base station.

Further, in a communication system according to the present embodiment, the intercell interference coordination (mentioned above) is applied to reduce an influence of interference between adjacent cells of the same channel.

The intercell interference coordination will be described again here with reference to FIGS. 3A to 3D. In the illustrated example, the intercell interference coordination is realized by a fractional frequency repetition combining a one-cell frequency repetition and a multi-cell frequency repetition (3-cell frequency repetition in FIG. 3).

Figure 3A:
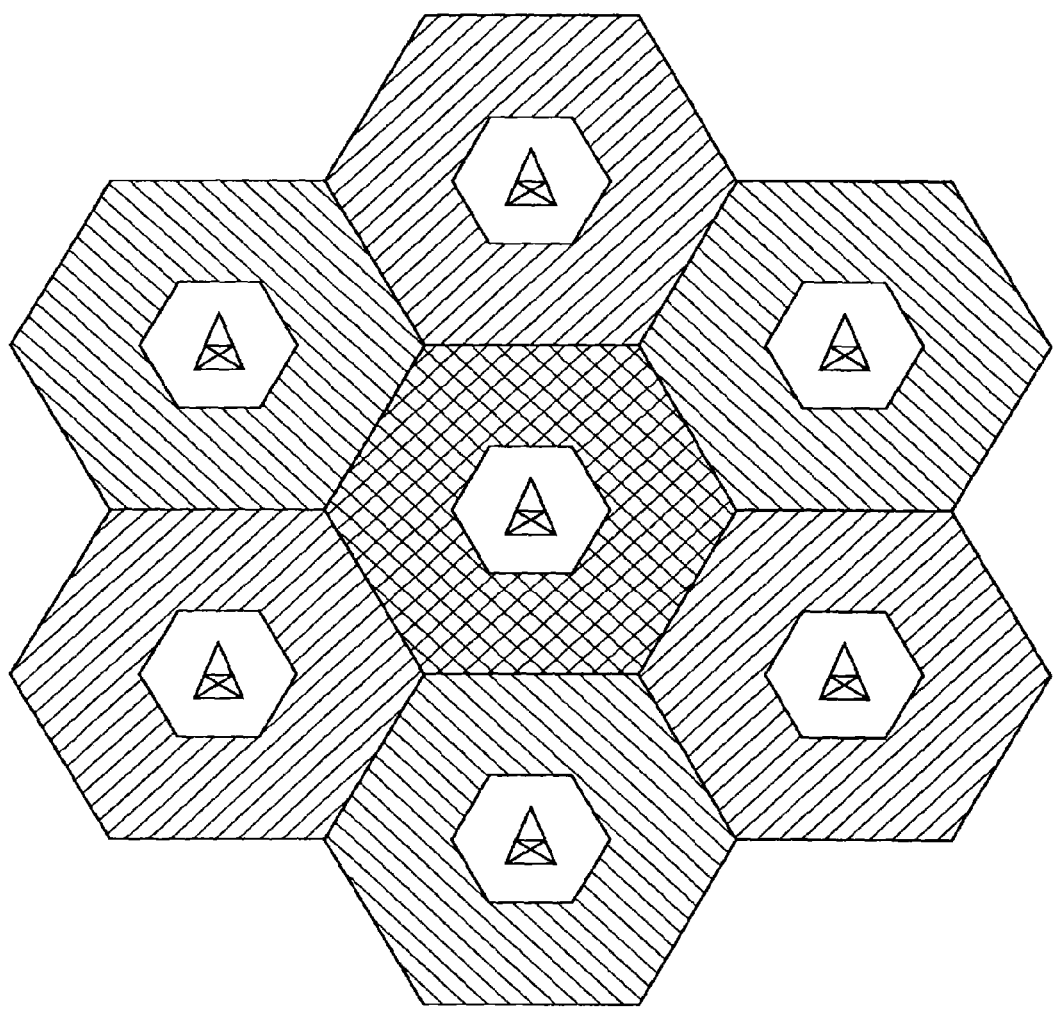
FIG. 3A is a diagram showing a cellular system realizing intercell interference coordination by a fractional frequency repetition.

In FIG. 3A, a hexagon represents one cell range. Each cell is divided into a white center region inside the cell and a shaded boundary region at cell ends. The central frequency assigned to the center region competes with that of adjacent cells (that is, the frequency repetition is 1), but interference between cells is avoided by controlling transmission power small enough so that a signal reaches only within a center region. On the other hand, different frequencies are assigned to boundary regions of adjacent cells (that is, the 3-cell frequency repetition is performed). In FIG. 3A, a difference in frequency band is represented by shading types (positive slopes, negative slopes, and grid-like slashes). By switching allocation of frequency assignment between adjacent cells as illustrated in FIG. 3, efficient frequency assignment can be operated.

Figure 3B:
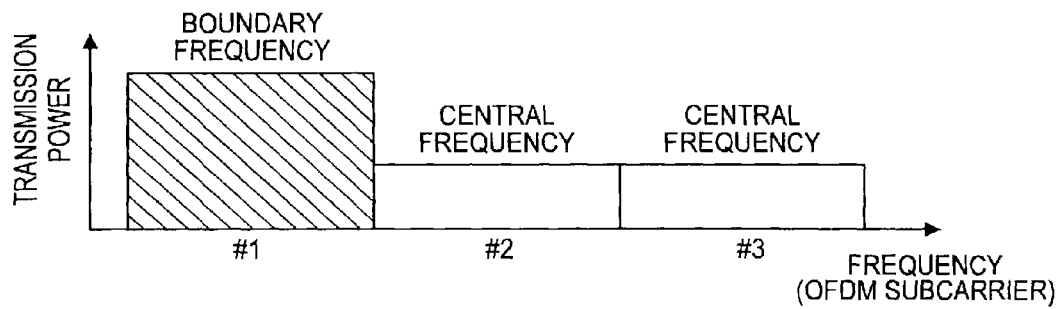
FIG. 3B is a diagram illustrating a frequency assignment inside the cell in which the fractional frequency repetition is performed.
Figure 3C:
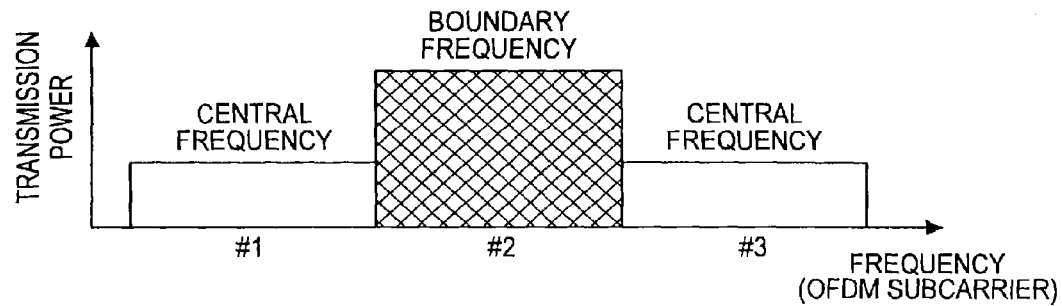
FIG. 3C is a diagram illustrating the frequency assignment inside the cell in which the fractional frequency repetition is performed.
Figure 3D:
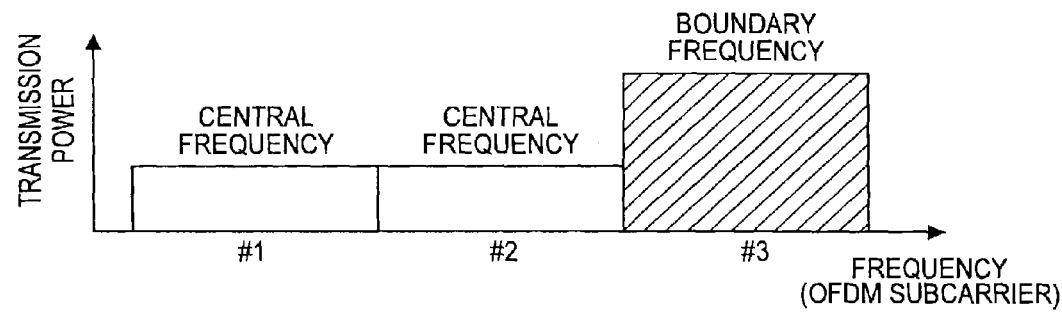
FIG. 3D is a diagram illustrating the frequency assignment inside the cell in which the fractional frequency repetition is performed.

FIGS. 3B to 3D show frequency assignment inside a cell and transmission power. In each cell, the system frequency band is divided into three subcarrier blocks and a subcarrier block used for frequency repetition between cells is assigned to the boundary frequency and a subcarrier block for 1-cell frequency repetition to the central frequency.

In a cell having a boundary region with negative slopes in FIG. 3A, for example, a subcarrier block #1 is assigned to the boundary frequency and subcarrier blocks #2 and #3 to the central frequency (see FIG. 3B). In a cell having a grid-like shaded boundary region in FIG. 3A, the subcarrier block #2 is assigned to the boundary frequency and the subcarrier blocks #1 and #3 to the central frequency (see FIG. 3C). In a cell having a boundary region with positive slopes in FIG. 3A, the subcarrier block #3 is assigned to the boundary frequency and the subcarrier blocks #1 and #2 to the central frequency (see FIG. 3D). In each cell, multiple access (OFDMA) is realized by, instead of all subcarriers of an OFDM signal being occupied by one communicating station, assigning subcarriers of the central frequency to a mobile station or relay station in the center region and subcarriers of the boundary frequency to a mobile station or relay station in the boundary region to share subcarriers by a plurality of communicating stations.

In any cell in FIG. 3A, transmission power of the central frequency is controlled to transmission power small enough so that a signal reaches only within a center region to prevent inter-cell interference even if the 1-cell frequency is repeated. While transmission power of the boundary frequency is large enough so that a radio wave reaches a cell end from the base station in the cell center, inter-cell interference does not occur because a frequency repetition of a plurality of cells (three cells in the illustrated example) is used.

Figure 4:
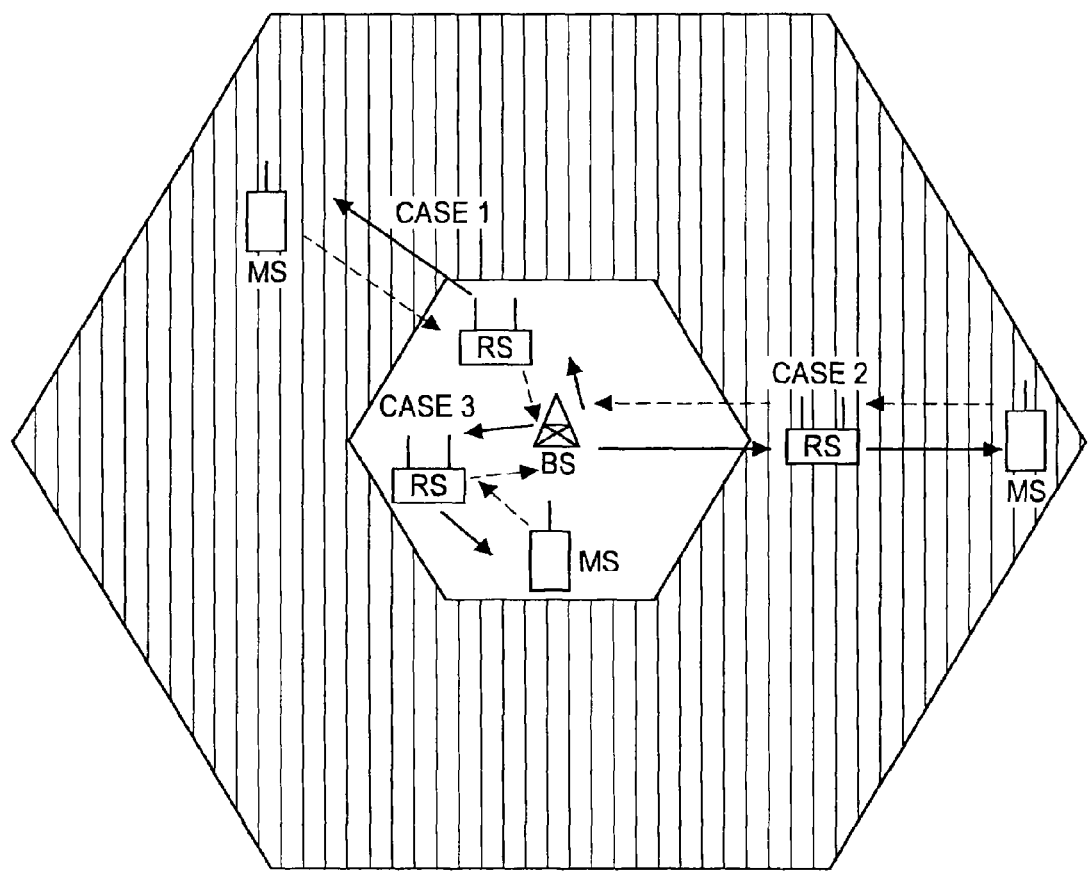
FIG. 4 is a diagram showing a communication example between a base station and mobile stations via relay stations inside the cell in which the intercell interference coordination is applied.

FIG. 4 shows a communication example between a base station and mobile stations via relay stations inside the cell in which the intercell interference coordination is applied. In FIG. 4, a downlink is denoted as a solid line arrow and an uplink as a broken line arrow.

As illustrated in FIG. 4, for each of the relay station and the mobile station, both cases of being located in the center region and the boundary region can be considered. In Case 1 in FIG. 4, a relay station in the center region relays a mobile station in the boundary region. In Case 2, a relay station and a mobile station belonging thereto are both located in the boundary region. In Case 3, a relay station and a mobile station belonging thereto are both located in the center region.

If the relay technology is introduced into a cellular system in which the intercell interference coordination is adopted, there is the possibility that a signal retransmitted from the relay station may interfere with adjacent cells. This is because while the relay technology improves throughput at cell edges through the mediation of the relay station, the introduction thereof is equivalent to increasing power in the vicinity of cell edges. The relay station is, when compared with the base station, closer to cell edges, which increases the possibility of interfering with the central frequency of adjacent cells. In the example shown in FIG. 4, when a relay station in the center region or boundary region relays a mobile station in the boundary region like Cases 1 and 2, the issue of interference with adjacent cells manifests itself. Conversely, the possibility of the relay station being interfered with by the central frequency of adjacent cells also increases.

Figure 5:
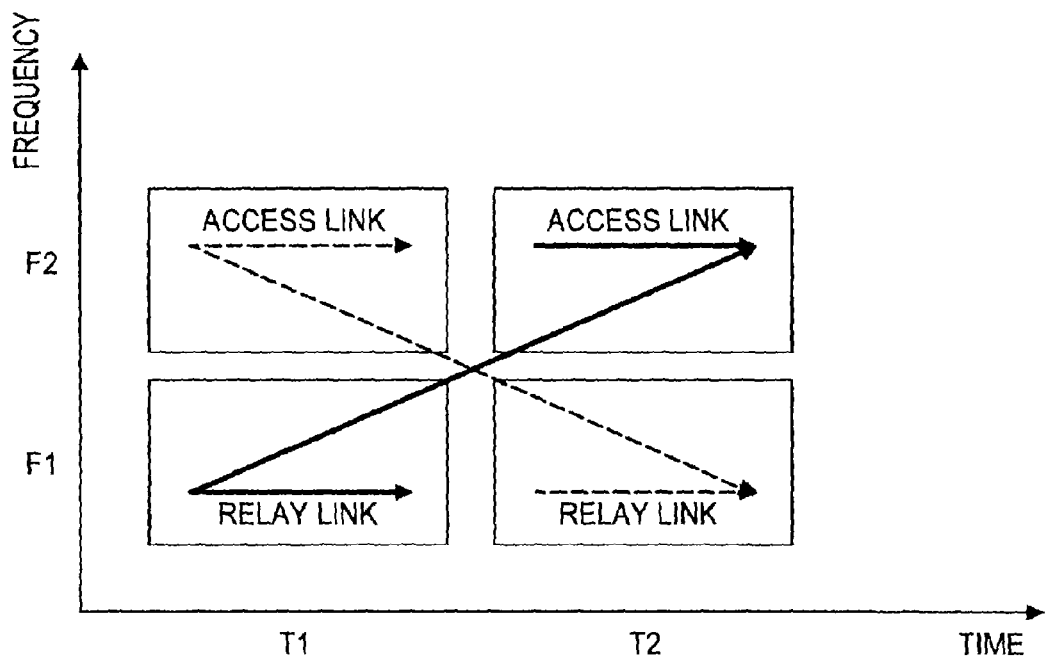
FIG. 5 is a diagram showing an example of a relay mode suitable to Case 1 in FIG. 4.

FIG. 5 shows an example of a relay mode suitable to Case 1 in FIG. 4. In the figure, a downlink is denoted as a solid line arrow and an uplink as a broken line arrow. The illustrated relay mode multiplexes a downlink and an uplink in the frequency direction, and demultiplexes a relay link and a access link in the frequency and time directions for each of a downlink and a uplink. A predetermined central frequency F1 and transmission power that is not enough to reach adjacent cells for a relay link and a boundary frequency F2 that avoids interference with adjacent cells for an access link in each of an uplink and a downlink multiplexed in the frequency direction.

During a downlink, a base station transmits a signal in the time slot of time T1 by using resource blocks of the central frequency F1 (a relay link of the downlink). A relay station receives the signal in the relay link of the downlink and after storing the signal in a buffer, transmits the signal in the time slot of time T2 by using resource blocks of the boundary frequency F2 (an access link of the downlink). Then, a mobile station receives the signal in the access link of the downlink in the time slot of time T2 using resource blocks of the boundary frequency F2. Note that the direct link of the downlink is a link to communicate directly from the base station to the mobile station not through the relay station, but in FIG. 5, they are illustrated in a long solid arrow across two squares. The direct link of the downlink uses the resource block of the frequency F1 at time T1, and it uses the resource block of the frequency F2 in the successive time slot T2.

During an uplink, on the other hand, a mobile station transmits a signal in the time slot of time T1 by using resource blocks of the boundary frequency F2 (an access link of the uplink) and a relay station receives the signal. Then, the relay station receives the signal in the access link of the uplink and after buffering the signal, transmits the signal in the time slot of time T2 by using resource blocks of the central frequency F1 (a relay link of the uplink) and a base station receives the signal. Note that the direct link of the downlink is a link to communicate directly from the base station to the mobile station not through the relay station, but in FIG. 5, they are illustrated in a long solid arrow across two squares. The direct link of the uplink uses the resource block of the frequency F2 at time T1, and it uses the resource block of the frequency F1 in the successive time slot T2.

Figure 6:
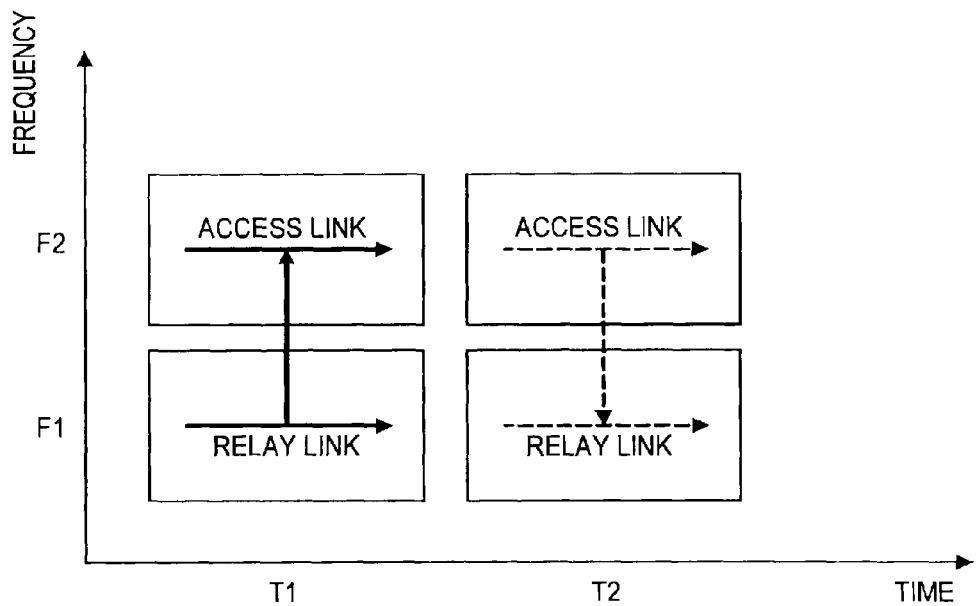
FIG. 6 is a diagram showing another example of the relay mode suitable to Case 1 in FIG. 4.

FIG. 6 shows another example of the relay mode suitable to Case 1 in FIG. 4. In the figure, a downlink is denoted as a solid line arrow and an uplink as a broken line arrow. The illustrated relay mode demultiplexes a downlink and an uplink in the time direction, and multiplexes a relay link and a access link in the frequency direction (It demultiplexes the downlink and the uplink in the time direction, however, in each of the downlink and the uplink, it multiplexes the relay link and the access link in the frequency direction). A predetermined central frequency F1 and transmission power that is not enough to reach adjacent cells are used for a relay link and a boundary frequency F2 that avoids interference with adjacent cells is used for an access link in the downlink. On the other hand, in the uplink, a predetermined central frequency F1 and transmission power that is not enough to reach adjacent cells are used for a access link.

As a downlink, a base station transmits a signal in the time slot of time T1 by using resource blocks of the central frequency F1 (a relay link of the downlink). While receiving the signal in the relay link of the downlink, a relay station transmits the signal in the time slot of the same time T1 by using resource blocks of the boundary frequency F2 (an access link of the downlink). Then, a mobile station receives the signal in the access link of the downlink in the time slot of time T1 using resource blocks of the boundary frequency F2.

As an uplink, on the other hand, a mobile station transmits a signal in the time slot of time T2 by using resource blocks of the boundary frequency F2 (an access link of the uplink) and a relay station receives the signal. Then, while receiving the signal in the access link of the uplink, the relay station transmits the signal in the time slot of time T2 by using resource blocks of the central frequency F1 (a relay link of the uplink) and a base station receives the signal.

The relay mode shown in FIG. 6 is similar to that shown in FIG. 4 in that the central frequency F1 is used for a relay link and the boundary frequency F2 for an access link, but is different in that the relay link and access link are multiplexed in the frequency direction in each of a downlink and an uplink and has an advantage that a delay involved in relay is slight.

However, the relay station in this case needs a circuit because the relay station performs a transmission/reception operation multiplexed in the frequency axis direction (that is, a transmission/reception operation is performed at the same time) such as transmitting at the boundary frequency F2 simultaneously while receiving at the central frequency F1.

Figure 7:
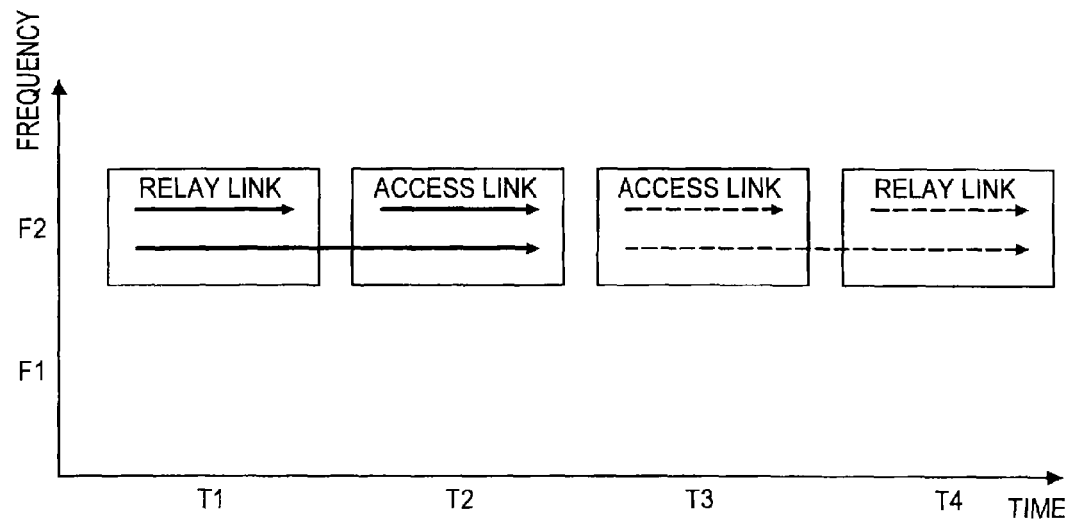
FIG. 7 is a diagram showing an example of the relay mode suitable to Case 2 in FIG. 4.

FIG. 7 shows an example of the relay mode suitable to Case 2 in FIG. 4. In the figure, a downlink is denoted as a solid line arrow and an uplink as a broken line arrow. The illustrated relay mode uses a predetermined boundary frequency and transmission power that is not enough to reach adjacent cells for both an uplink and a downlink, demultiplexes the uplink and downlink in the time direction, and demultiplexes a relay link and an access link in the time direction in each of the uplink and downlink.

During a downlink, a base station transmits a signal in the time slot of time T1 by using resource blocks of the boundary frequency F2 (a relay link of the downlink). A relay station receives the signal in the relay link of the downlink and after storing the signal in a buffer, transmits the signal in the time slot of time T2 by using resource blocks of the boundary frequency F2 (an access link of the downlink). Then, a mobile station receives the signal in the access link of the downlink in the time slot of time T2 using resource blocks of the boundary frequency F2.

During an uplink, on the other hand, a mobile station transmits a signal in the time slot of time T3 by using resource blocks of the boundary frequency F2 (an access link of the uplink) and a relay station receives the signal. Then, the relay station receives the signal in the access link of the uplink and after buffering the signal, transmits the signal in the time slot of time T4 by using resource blocks of the boundary frequency F2 (a relay link of the uplink) and a base station receives the signal.

Subsequently, an influence on adjacent cells will be considered.

The relay station is, when compared with the base station, closer to cell edges, which increases the possibility of interfering with the central frequency of adjacent cells. Conversely, the possibility of the relay station being interfered with by the central frequency of adjacent cells also increases. To repeat again, even if the base station transmits a signal of the boundary frequency with strong power, interference with the central frequency of adjacent cells is small because the strong power sufficiently attenuates at cell edges. In contrast, the relay station transmits the boundary frequency closer to cell edges and thus, it is extremely likely that reception of mobile stations using the central frequency of adjacent cells is interfered with. This is because while the relay technology improves throughput at cell edges through the mediation of the relay station, the introduction thereof is equivalent to increasing power in the vicinity of cell edges.

On the other hand, while the base station receives a signal using the boundary frequency from a mobile station in the boundary region, interference with the central frequency of adjacent cells is small. This is because base stations of adjacent cells and the base station of the local cell are sufficiently apart from each other and the base station controls transmission power at the central frequency to a low level. Reception of relay stations located in the boundary region is similarly considered to be without issues.

In summary, if relay technology is introduced into a cellular system, a mobile station located in the boundary region uses the boundary frequency of the local cell, which is to be the central frequency of adjacent cells and therefore, an issue is considered to arise in reception of the mobile station.

Confronted with such an issue, the inventors focused on the fact that a relay station is typically not used for communication between a base station and a mobile station. That is, when receiving conditions of a mobile station located on the periphery (boundary region) of a cell deteriorate, a signal is transmitted/received via a relay station. Thus, an access link via the relay station and a direct link from the base station are present in signals of the boundary frequency arriving at the mobile station. The following two methods are proposed herein as methods for a mobile station located in the boundary region and using the boundary frequency of the local cell to avoid interference with the central frequency of adjacent cells.

(1) First Method

Frequency bands assigned to a relay station are limited. That is, positions of frequency used via a relay station are decided by a system in advance in assignment of the boundary frequency in a cell. Then, the central frequency is assigned on the adjacent cell side by avoiding positions of frequency more likely to be affected by the relay station.

(2) Second Method

Frequency bands to be permitted are changed in accordance with the position of a relay station. Depending on the position of a relay station, how the central frequency of adjacent cells is affected changes. Thus, the base station can decrease locations where it is likely to interfere of the central frequency on the adjacent cell side by setting regions of the boundary frequencies permitted to the relay station in accordance with the position of the relay station.

First, the system operation and system configuration to realize the first method will be described in detail.

Figure 8A:
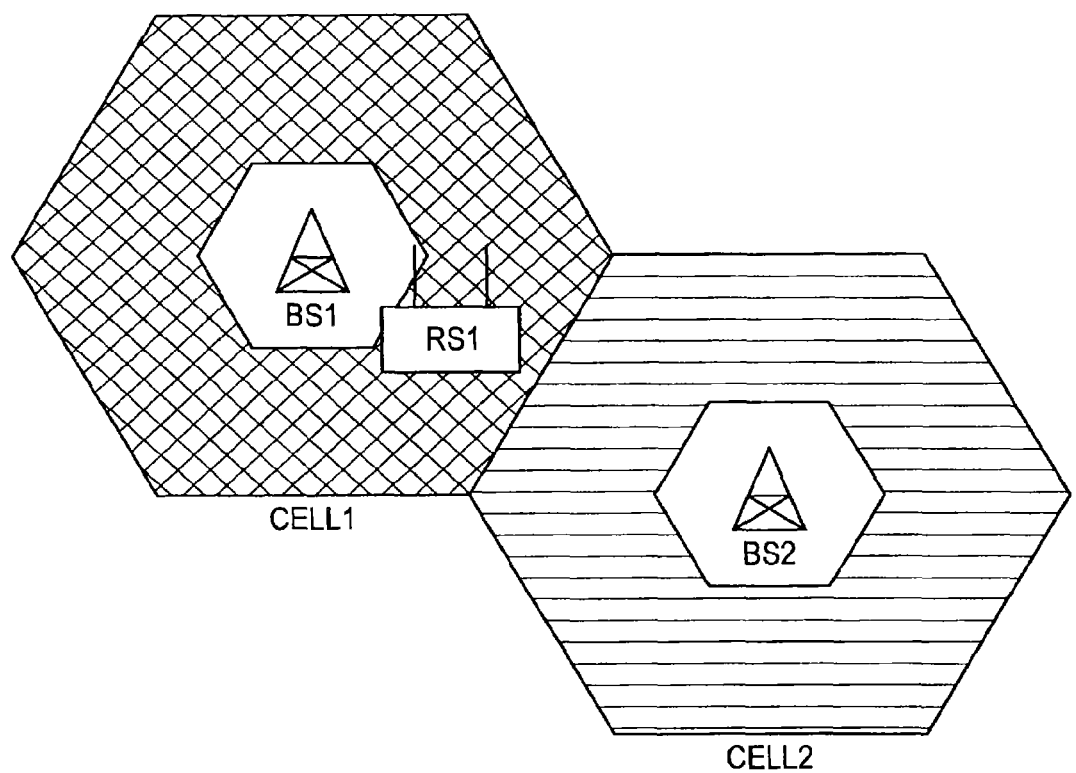
FIG. 8A is a diagram illustrating a first method of adjusting interference with a central frequency of adjacent cells by limiting frequency bands to be assigned to the relay station.
Figure 8B:
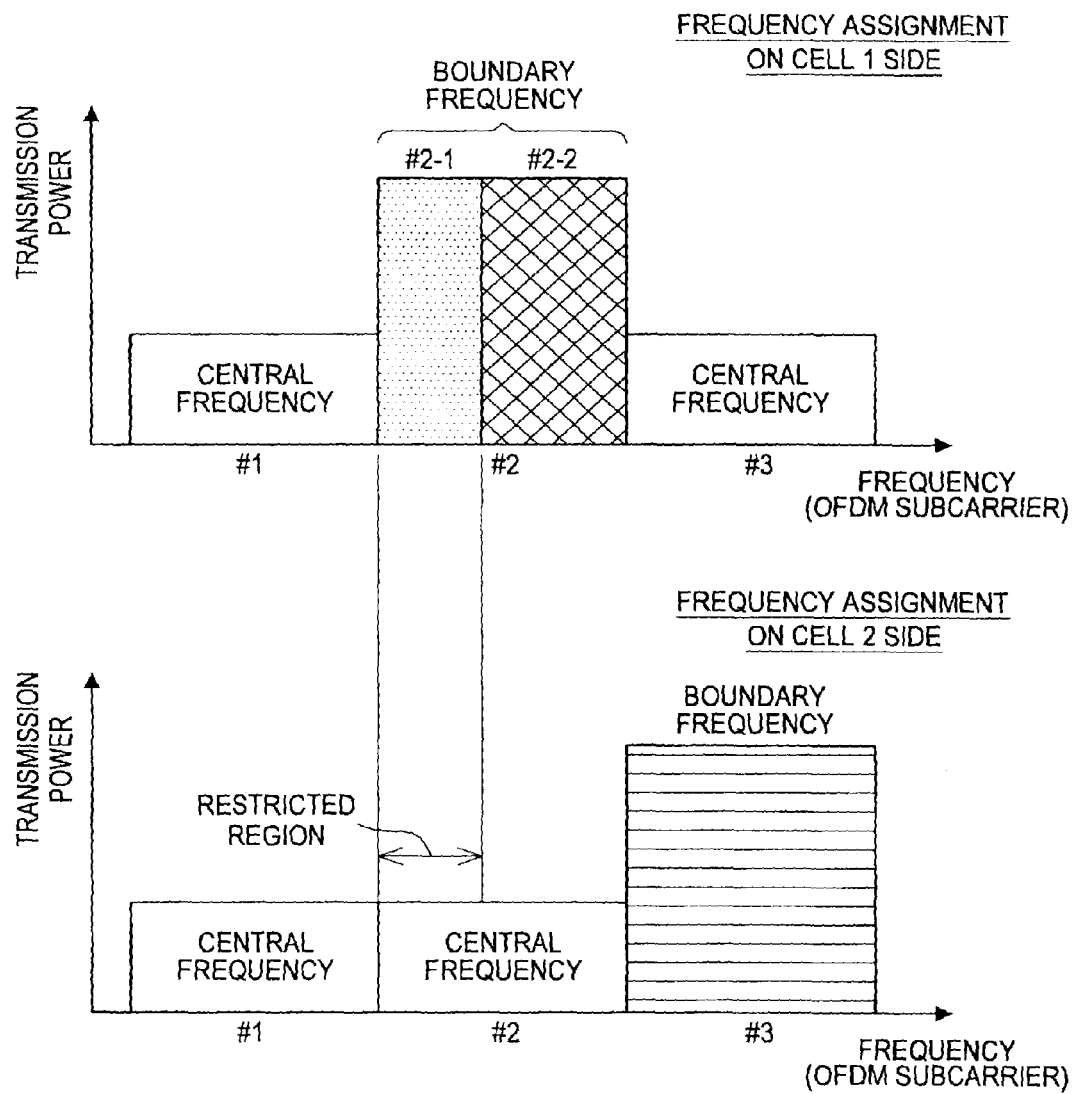
FIG. 8B is a diagram illustrating the first method of adjusting interference with the central frequency of adjacent cells by limiting frequency bands to be assigned to the relay station.

FIG. 8A shows how Cell 1 and Cell 2 that perform a fractional frequency repetition are adjacent to each other. FIG. 8B shows a frequency assignment example of Cell 1 and Cell 2.

On the Cell 1 side, frequency bands assigned to the relay station are limited. More specifically, while a subcarrier block #2 is used as the boundary frequency, as shown in the upper part of FIG. 8B, the subcarrier block #2 is further divided into a subcarrier block #2-1 used for a relay link, that is, for relaying and a subcarrier block #2-2 used for a direct link (that is, for a mobile station in the boundary region) to decide frequency bands to be used for the relay station in advance. After the decision is made, it is prohibited to assign resources in the subcarrier block #2-2 to a relay station RS1, and a base station BS 1 limits assignment to the relay station RS1 in the boundary region from within the subcarrier block #2-1. This subcarrier block #2-1 is a given interference band that Cell 1 interferes adjacent Cell 2, and for Cell 2, it is a restricted band. Then, the base station BS1 of Cell 1 transmits information about frequency bands (for example, the subcarrier block #2-1) decided to be used for the relay station to a base station BS2 of the adjacent Cell 2 through, for example, a backhaul.

Figure 9:
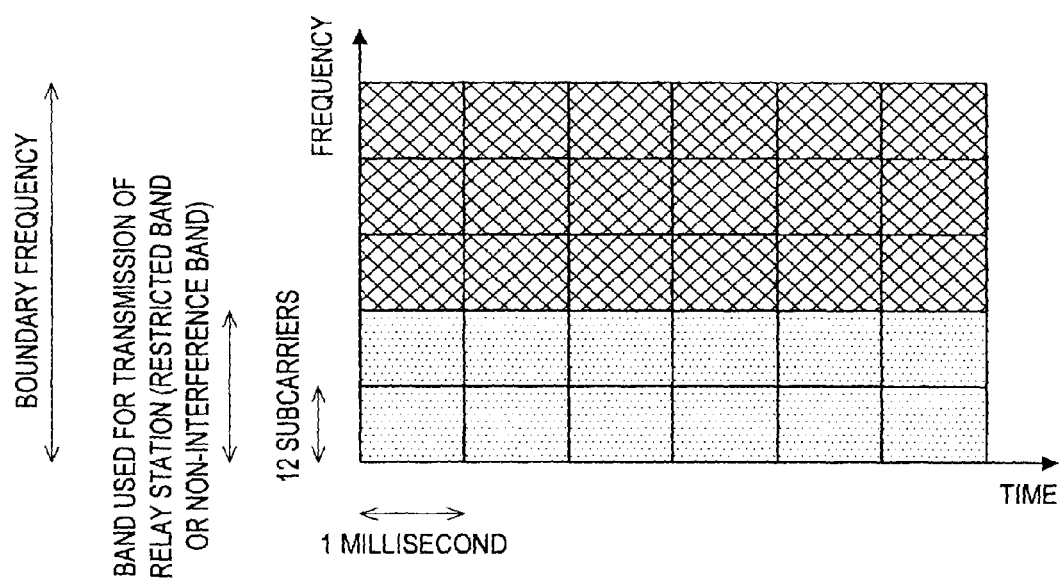
FIG. 9 is a diagram showing how a portion of resource blocks assigned to a boundary frequency is assigned in advance exclusively for a relay link.

FIG. 9 shows how a portion of resource blocks assigned to a boundary frequency is assigned in advance exclusively for a relay link. Certain preset resource blocks of the boundary frequency are assigned to a relay link, that is, for the relay station. One resource block has a 12-subcarrier width in the frequency direction and a time length of 1 millisecond (mentioned above). In FIG. 9, dot-shaded resource blocks of boundary frequency bands are assigned for the relay station and grid-like shaded resource blocks are prohibited from being assigned to the relay station.

On the Cell 2 side, on the other hand, while the subcarrier blocks #1 and #2 are used as the central frequencies of the local cell, it is already known thanks to a notification from the base station BS1 of Cell 1 that the subcarrier block #2-1 of these subcarrier blocks is a region that may be used for a relay link, that is, used by a relay station on the adjacent Cell 1 side, in other words, it is more likely that an issue of reception by a mobile station arises in the subcarrier block #2-1.

Thus, when the central frequency is assigned in the local cell, as shown in the lower part of FIG. 8B, the scheduler mounted on the base station BS2 of Cell 2 avoids subcarrier block #2-1 or lower the degree of priority of the subcarrier block #2-1 for scheduling. This makes less likely that an issue of reception by a mobile station arises in Cell 2.

Figure 10:
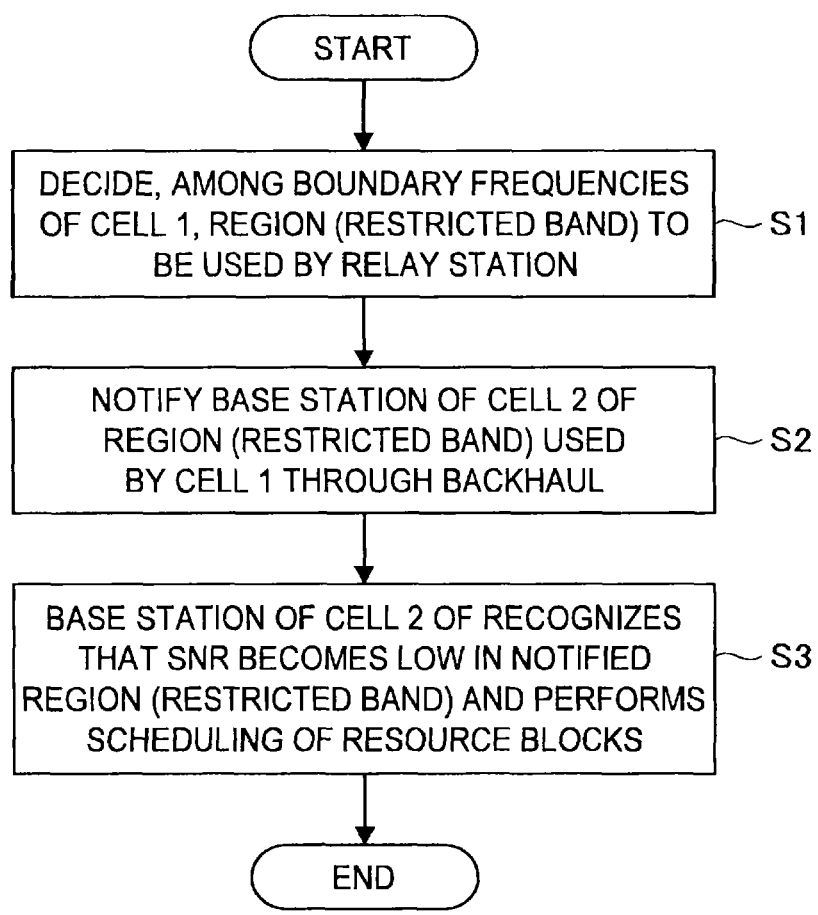
FIG. 10 is a flow chart showing a procedure for system operation to realize the first method of limiting frequency bands to be assigned to the relay station.

FIG. 10 shows the procedure for system operation to realize the first method that adjusts interference with the central frequency of adjacent cells by limiting frequency bands to be assigned to a relay station in the form of a flow chart.

First, the base station of Cell 1 decides a region (restricted bands) of the boundary frequency of the local cell to be used for a relay link, that is, used by a relay station (step S1).

Then, the base station of Cell 1 notifies the base station of the adjacent Cell 2 via, for example, a backhaul of information about the region (restricted bands) to be used for a relay link, that is, used by a relay station in the local cell (step S2).

The base station of Cell 2, on the other hand, recognizes that the SNR becomes low for reception by a mobile station in the notified region (restricted bands) and plans a schedule for the local cell by avoiding the region or lowering an order of priority thereof (step S3).

Frequency hopping may be allowed for frequency assignment to relay stations over time. By allowing frequency hopping, the degree of interference with the central frequency of adjacent cells can be equalized.

Figure 11:
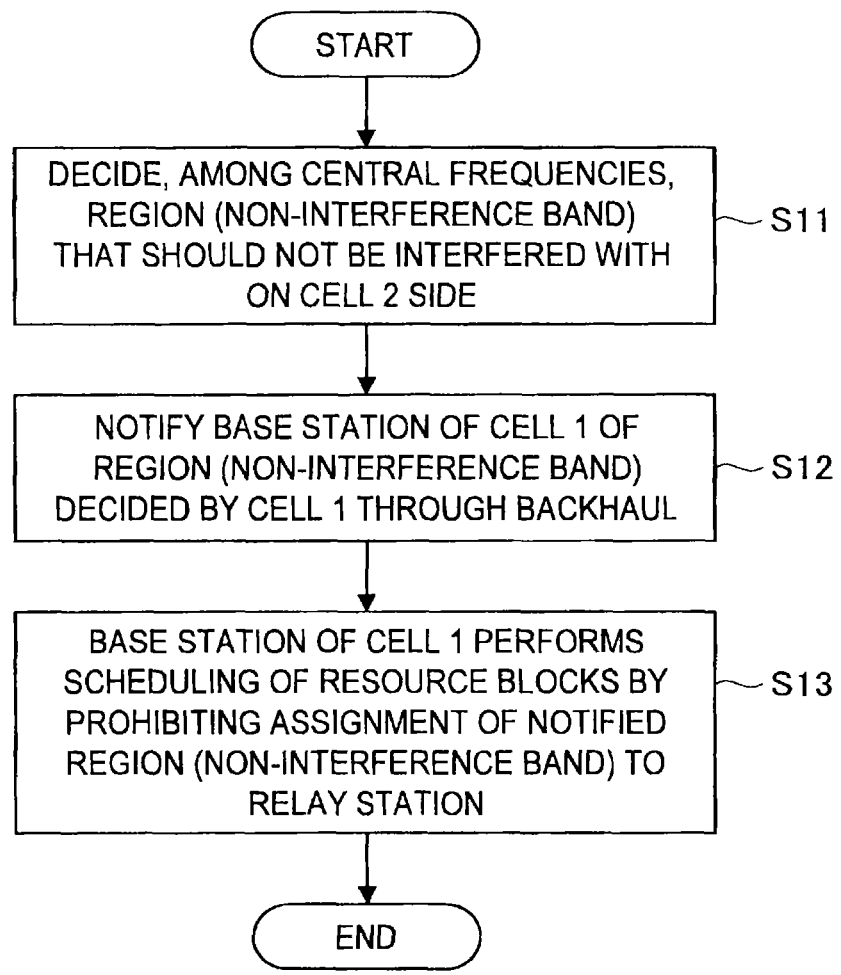
FIG. 11 is a flow chart showing the procedure (modification) for system operation to realize the first method of limiting frequency bands to be assigned to the relay station.

In the example shown above, one base station of a Cell 1 takes the lead in limiting frequency bands of the boundary frequency to be assigned to a relay link, that is, a relay station. In contrast, a modification in which the adjacent Cell 2 side notifies the base station of Cell 1 of bands of the central frequency in the local cell that should not be interfered with and the base station on the Cell 1 side plans a schedule in such a way that the notified bands are not assigned to a relay link, that is, a relay station can also be considered. FIG. 11 shows the procedure for system operation to realize the first method by the latter in the form of a flow chart.

First, the base station of Cell 2 decides a region (non-interference bands) of the central frequency of the local cell that should not be interfered with (step S11) and notifies the base station of the adjacent Cell 1 of information about the region via, for example, a backhaul (step S12).

The base station of Cell 1, on the other hand, plans a schedule for the local cell by prohibiting assignment of the notified region (non-interference bands) for a relay link, that is, a relay station (step S13).

Figure 12:
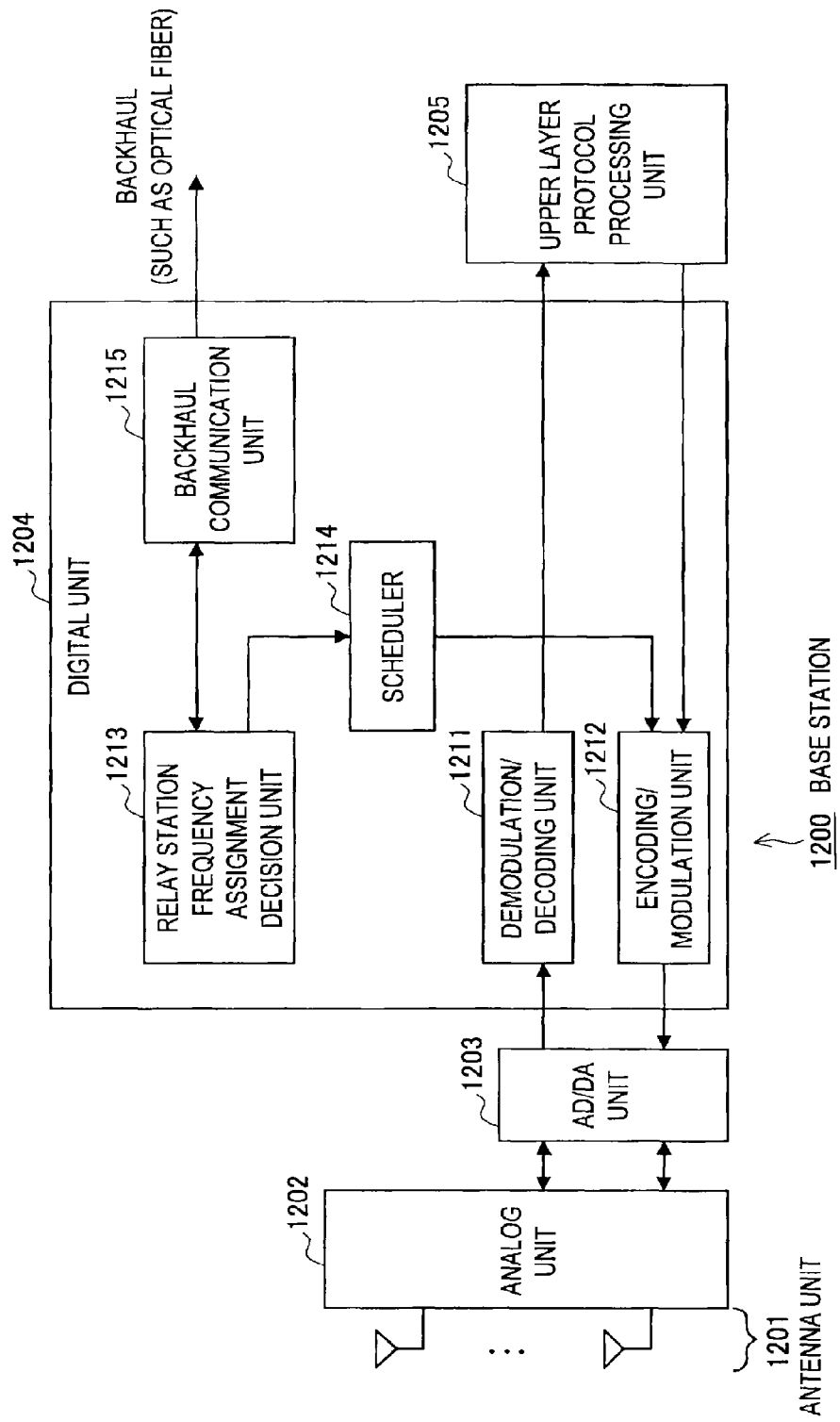
FIG. 12 is a diagram schematically showing a functional configuration for the base station operating in a cellular system according to an embodiment of the present invention to realize the first method.

FIG. 12 schematically shows a functional configuration for the base station operating in a cellular system according to the present embodiment to realize the first method. An illustrated base station 1200 is constituted by an antenna unit 1201, an analog unit 1202 that performs analog processing of a transmission/reception signal, an AD/DA processing unit 1203 that performs digital conversion of an analog reception signal or analog conversion of a digital transmission signal, a digital unit 1204 that performs digital processing of a transmission/reception signal, and an upper layer protocol processing unit 1205 that performs a data transmission request, reception data processing and the like.

The base station 1200 has, for example, a plurality of antenna elements as the antenna unit 1201 and adopts the space division multiple access scheme, like MU-MIMO or SDMA, in which radio resources on spatial axes are shared by a plurality of users to realize high throughput communication, which is not, however, directly related to the gist of the present invention and thus is herein omitted.

The upper layer protocol processing unit 1205 can also be constituted as a general computer system such as a personal computer, which is not, however, directly related to the gist of the present invention and thus is herein omitted.

The digital unit 1204 includes, in addition to a demodulation/decoding unit 1211 that performs demodulation and decoding processing of a reception signal and an encoding/modulation unit 1212 that performs encoding and modulation processing of a transmission signal, functional modules such as a relay station frequency assignment decision unit 1213 that makes a decision about frequency assignment to relay stations of the local cell or adjacent cells, a scheduler 1214 that manages, that is, schedules radio resources in the local cell, and a backhaul communication unit 1215 that performs communication with base stations of other cells through a backhaul constituted by optical fibers or the like. The functional modules 1213 and 1214 can be constituted by dedicated hardware, but can also be realized by a predetermined software program being executed by a processor.

The relay station frequency assignment decision unit 1213 decides frequency bands (restricted bands) used by relay stations in the local cell or frequency bands (non-interference bands) of the central frequency of the local cell that should not be interfered with. Any method of deciding restricted bands or non-interference bands may be used. Information about decision content is transmitted to, for example, base stations of adjacent cells through the backhaul communication unit 1215. Moreover, when frequency bands (non-interference bands) of the central frequency of an adjacent cell that should not be interfered with are received from the base station of the adjacent cell, the relay station frequency assignment decision unit 1213 decides frequency bands to be used by relay stations of the local base station by excluding the applicable bands.

Incidentally, the relay station frequency assignment decision unit 1213 may allow frequency hopping for frequency assignment to relay stations over time. By allowing frequency hopping, the degree of interference with the central frequency of adjacent cells can be equalized.

The scheduler 1214 assigns, that is, schedules radio resources in the local cell according to content decided by the relay station frequency assignment decision unit 1213. The minimum unit of scheduling is the resource block.

Figure 13:
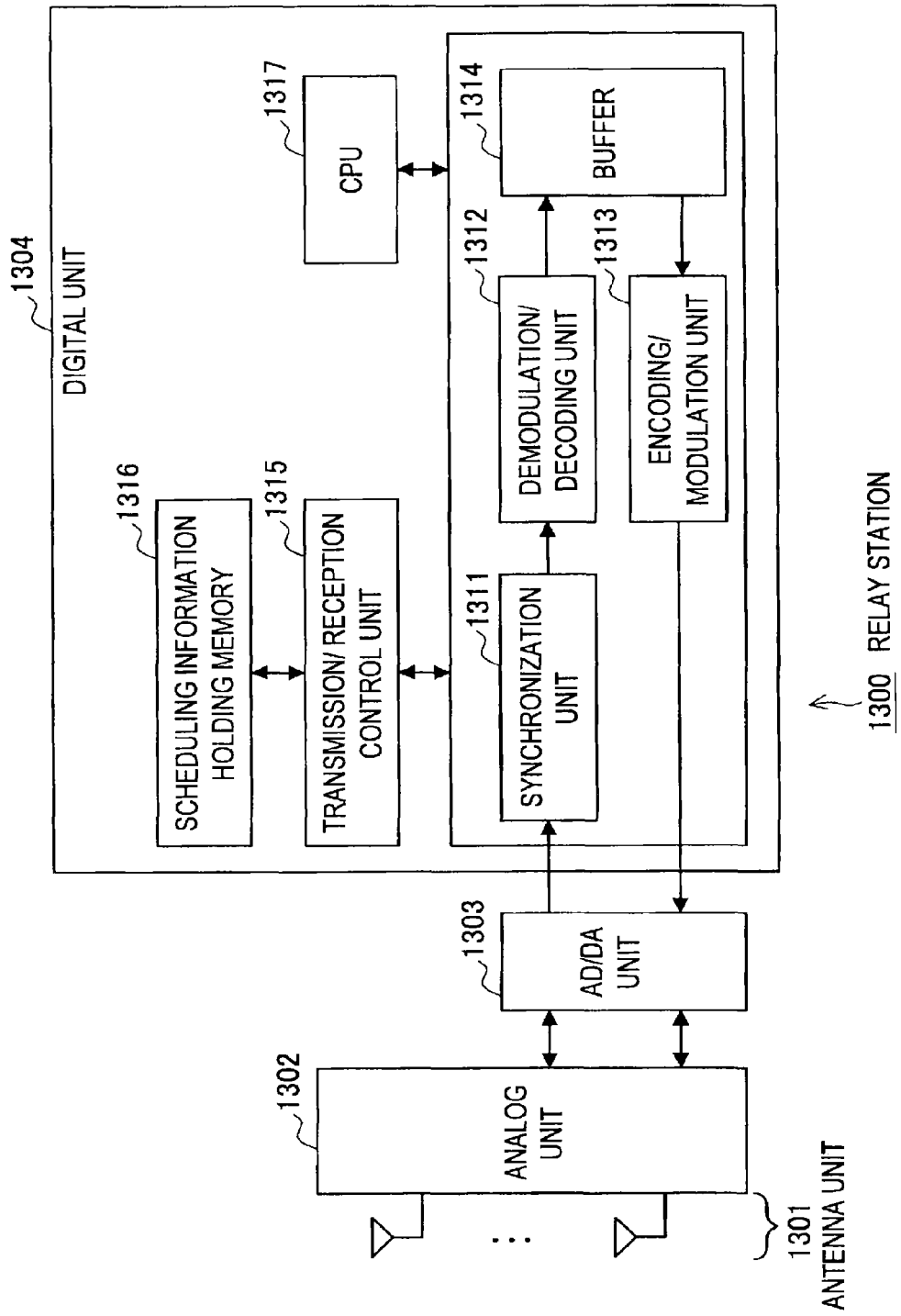
FIG. 13 is a diagram schematically showing the functional configuration of the relay station operating in the cellular system according to an embodiment of the present invention.

FIG. 13 schematically shows the functional configuration of the relay station operating in the cellular system according to the present embodiment. An illustrated relay station 1300 is constituted by an antenna unit 1301, an analog unit 1302 that performs analog processing of a transmission/reception signal, an AD/DA processing unit 1303 that performs digital conversion of an analog reception signal or analog conversion of a digital transmission signal, and a digital unit 1304 that performs digital processing of a transmission/reception signal.

The relay station 1300 has, for example, a plurality of antenna elements as the antenna unit 1301 and may adopt the space division multiple access scheme (same as above), but the gist of the present invention is not limited to this.

The digital unit 1304 is constituted by a transmission/reception control unit 1315 that controls operations of transmission/reception units, a scheduling information holding memory 1316 that stores scheduling information transmitted from the base station 1200 through the control channel, and a CPU (Central Processing Unit) 1317 that controls operations inside the digital unit 1304 in a unifying fashion. The transmission/reception units are constituted by a synchronization unit 1311 that acquires synchronization from digital reception signals, a demodulation/decoding unit 1312 that performs demodulation and decoding processing of a reception signal according to the acquired synchronization, a buffer 1314 that temporarily holds transmission data, and an encoding/modulation unit 1313 that performs encoding and modulation processing of a transmission signal.

The transmission/reception control unit 1315 controls reception processing in a relay link and transmission processing in an access link of a downlink and also reception processing in an access link and transmission processing in a relay link of an uplink using specified resource blocks according to scheduling information stored in the scheduling information holding memory 1316.

The buffer 1314 has data received in a relay link of a downlink and addressed to a mobile station 1400 (described later) or data received in an access link of an uplink and addressed to the base station 1200 stored temporarily therein and transmits the data to the mobile station 1400 as an access link of the downlink or to the base station 1200 as a relay link of the uplink. The relay station 1300 temporarily holds a signal to be relayed in the buffer 1314 after demodulating and decoding the signal and then encodes and modulates the signal again for transmission. That is, the DF mode (mentioned above) is applied, but AF mode may also be applied.

Note that the processing procedure illustrated in FIGS. 10 and 11, the configuration example of the base station 1200 illustrated in FIG. 12 and the configuration example of the relay station 1300 illustrated in FIG. 13 are premised on that the base station 1200 determines the frequency to assign to the relay station 1300 in the local cell. As its alternative example, there may be a method that the relay station, instead of the base station, determines the frequency for using by itself, as a configuration in which the relay station 1300 has a relay station frequency decision unit (a similar function to the relay station frequency assignment decision unit 1213 of the base station 1400). In such an alternative example, the relay station 1300 is to be informed by the base station in the cell of information necessary for frequency decision, or the relay station 1300 collects the information by its own. Moreover, the processing to determine the relay mode can be dispersed on more than two different devices (for example, a base station and a relay station), considering differences between the access link and the relay link, or differences between the uplink and the downlink.

Figure 14:
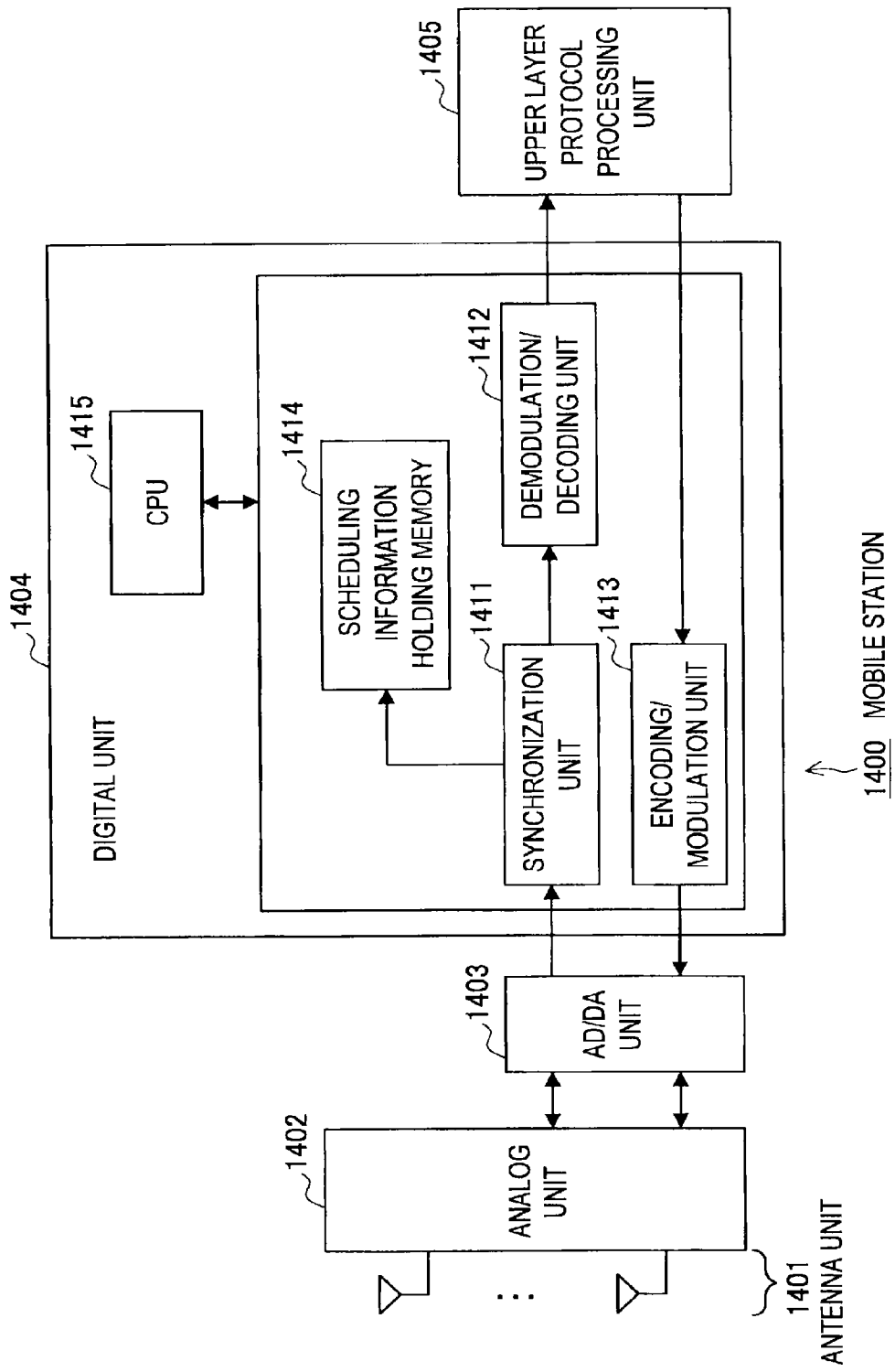
FIG. 14 is a diagram schematically showing the functional configuration of the mobile station operating in the cellular system according to an embodiment of the present invention.

FIG. 14 schematically shows the functional configuration for the mobile station operating in a cellular system according to the present embodiment. An illustrated mobile station 1400 is constituted by an antenna unit 1401, an analog unit 1402 that performs analog processing of a transmission/reception signal, an AD/DA processing unit 1403 that performs digital conversion of an analog reception signal or analog conversion of a digital transmission signal, a digital unit 1404 that performs digital processing of a transmission/reception signal, and an upper layer protocol processing unit 1405 that performs a data transmission request, reception data processing and the like.

The mobile station 1400 has, for example, a plurality of antenna elements as the antenna unit 1401 and may adopt the space division multiple access scheme (same as above), but the gist of the present invention is not limited to this. The upper layer protocol processing unit 1405 can also be constituted as a general computer system such as a personal computer (same as above).

The digital unit 1404 is constituted by a synchronization unit 1411 that acquires synchronization from digital reception signals, a demodulation/decoding unit 1412 that performs demodulation and decoding processing of a reception signal according to the acquired synchronization, an encoding/modulation unit 1413 that performs encoding and modulation processing of a transmission signal, a scheduling information holding memory 1414 that stores scheduling information transmitted from the base station 1200 through the control channel, and a CPU 1415 that controls operations inside the digital unit 1404 in a unifying fashion.

The scheduling information holding memory 1414 has resource blocks assigned to the local station stored therein as scheduling information. The synchronization unit 1411 and the demodulation/decoding unit 1412 perform reception processing by using resource blocks assigned for an access link of a downlink. The encoding/modulation unit 1413 performs a transmission operation by using resource blocks assigned for an access link of an uplink.

It should be understood that, by arranging a relay station in a cell of the base station 1200 between adjacent cells constituted by arranging the base station 1200, the relay station 1300, and the mobile station 1400 shown in FIGS. 12 to 14 respectively, interference with the central frequency of adjacent cells by a signal of the boundary frequency transmitted from the relay station can be adjusted and improvement of the efficiency of frequency utilization can be realized, contributing to improvement of throughput for the user.

Subsequently, the system operation and system configuration to realize the second method will be described in detail.

Figure 15A:
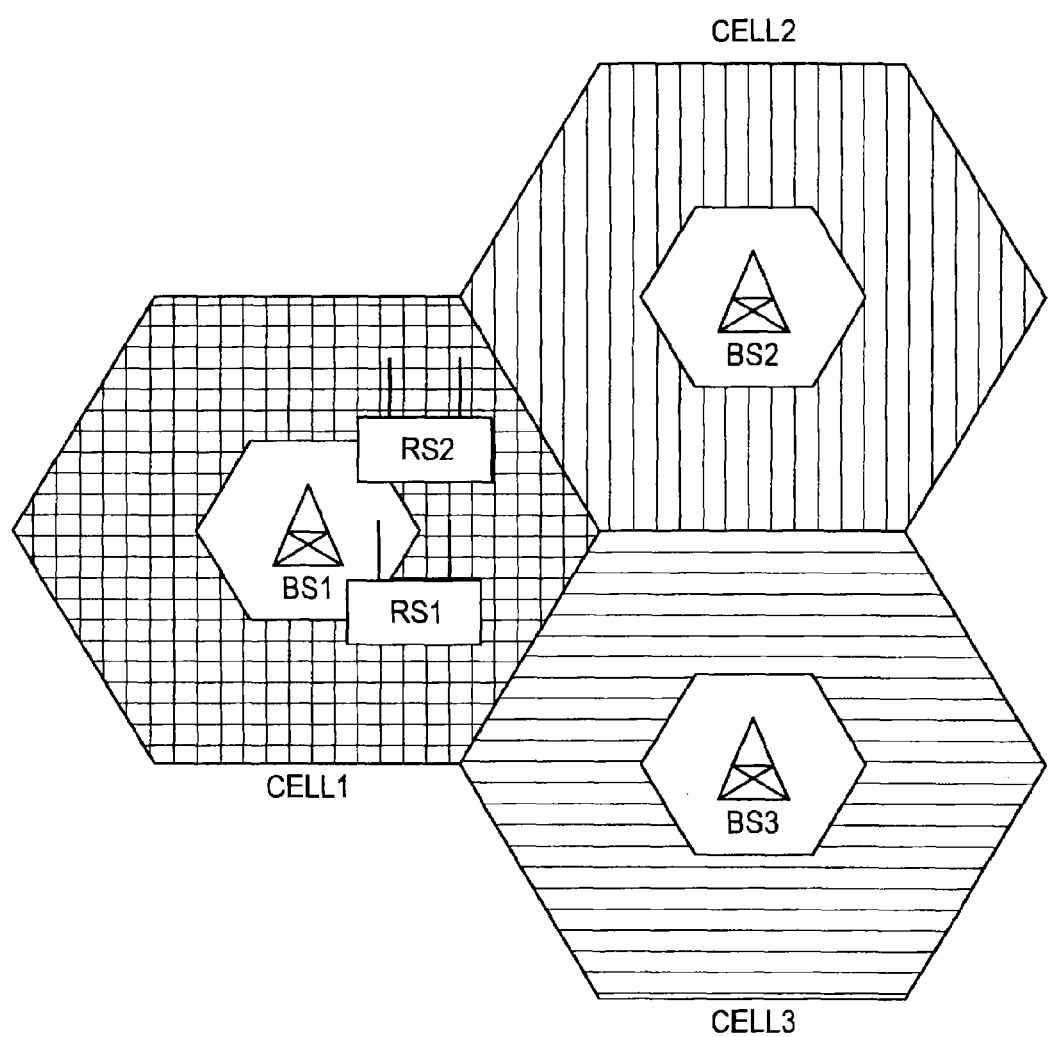
FIG. 15A is a diagram showing how three Cells 1 to 3 performing the fractional frequency repetition are adjacent to each other (a diagram to illustrate a second method of adjusting interference with the central frequency of adjacent cells by assigning frequency bands according to the position of the relay station).

FIG. 15A shows how three Cells 1 to 3 performing the fractional frequency repetition are adjacent to each other. In FIG. 15A, a hexagon represents one cell range. Each Cell 1 to 3 is divided into a white center region inside the cell and a shaded boundary region at cell ends. The central frequency assigned to the center region competes with that of adjacent cells (that is, the frequency repetition is 1), but interference between cells is avoided by controlling transmission power small enough so that a signal reaches only within a center region. On the other hand, different frequencies are assigned to boundary regions of adjacent cells. In FIG. 15A, a difference in frequency band is represented by shading types (grid lines, vertical stripes, and horizontal stripes).

Figure 15B:
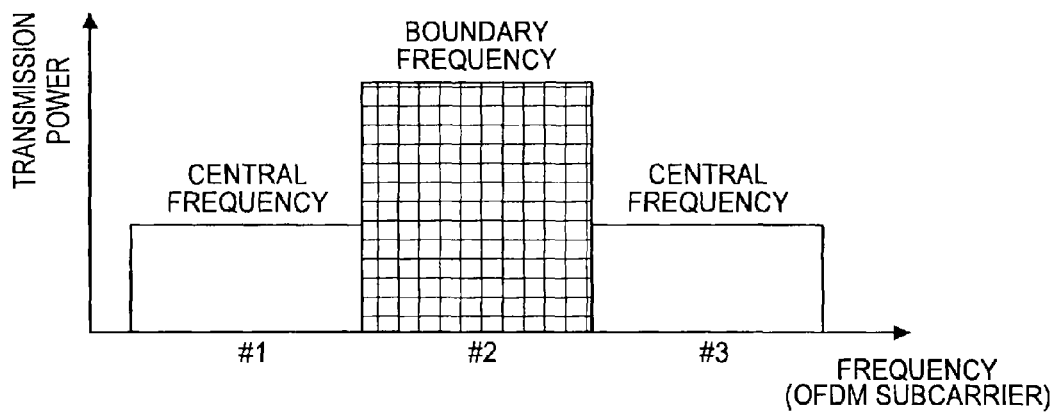
FIG. 15B is a diagram showing a frequency assignment example in Cell 1 in FIG. 15A.
Figure 15C:
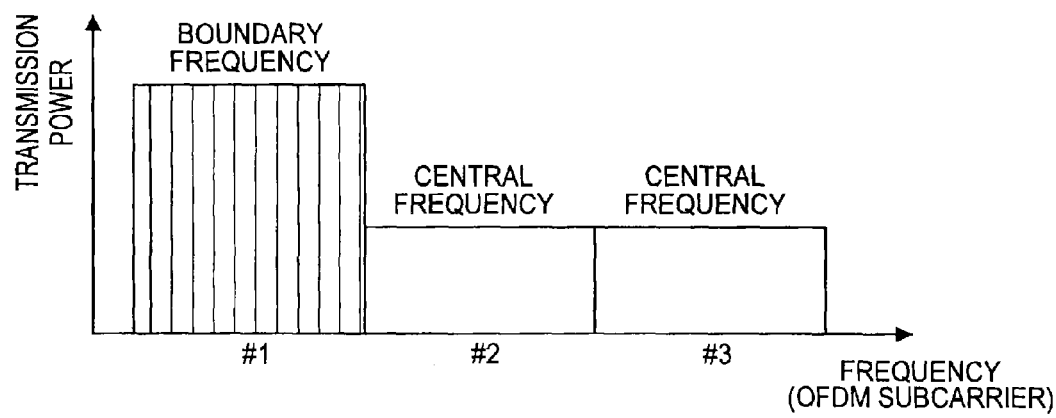
FIG. 15C is a diagram showing a frequency assignment example in Cell 1 in FIG. 15A.
Figure 15D:
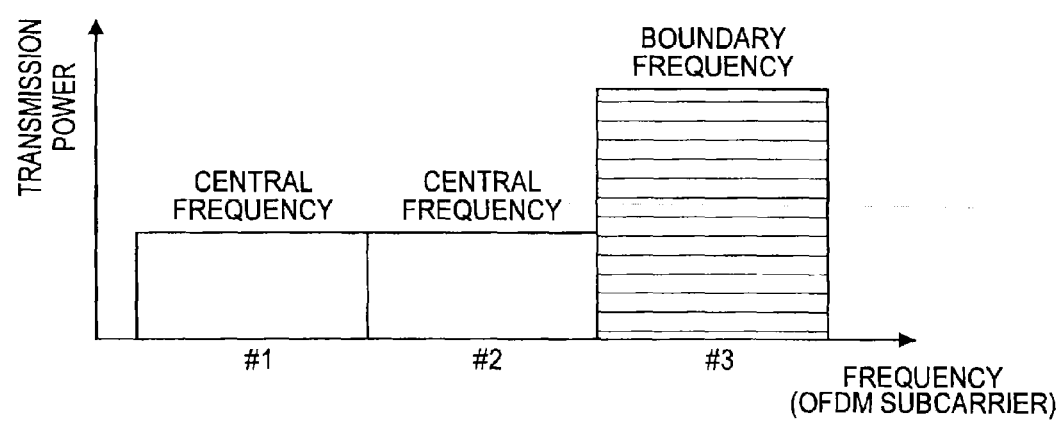
FIG. 15D is a diagram showing a frequency assignment example in Cell 1 in FIG. 15A.

FIGS. 15B to 15D show frequency assignment examples of each Cell 1 to 3. In each Cell 1 to 3, the system frequency band is divided into three blocks and a subcarrier block used for frequency repetition between cells is assigned to the boundary frequency and a subcarrier block for 1-cell frequency repetition to the central frequency.

In Cell 1 having a boundary region with grid line shading, the subcarrier block #2 is assigned to the boundary frequency and the subcarrier blocks #1 and #3 to the central frequency (see FIG. 15B). In Cell 2 having a boundary region with vertical stripe shading, the subcarrier block #1 is assigned to the boundary frequency and the subcarrier blocks #2 and #3 to the central frequency (see FIG. 15C). In Cell 3 having a boundary region with horizontal stripe shading, the subcarrier block #3 is assigned to the boundary frequency and the subcarrier blocks #1 and #2 to the central frequency (see FIG. 15D). Multiple access (OFDMA) is realized by, instead of all subcarriers of an OFDM signal being occupied by one communicating station, assigning subcarriers of the central frequency to a mobile station or relay station in the center region and subcarriers of the boundary frequency to a mobile station or relay station in the boundary region to share subcarriers by a plurality of communicating stations.

As shown in FIG. 15A, a relay station 1 (RS1) and a relay station 2 (RS2) are installed in Cell 1. The relay station 1 is close to the adjacent Cell 3 and thus, the relay station 1 greatly interferes with terminals using the central frequency of Cell 3. The relay station 2 is close to the adjacent Cell 2 and thus, the relay station 2 greatly interferes with terminals using the central frequency of Cell 2. Thus, in the present embodiment, interference with the central frequency of each of the adjacent Cell 3 and Cell 2 is reduced by setting the frequency permitted to the relay station 1 and the relay station 2 in accordance with the installation location respectively.

Figure 16:
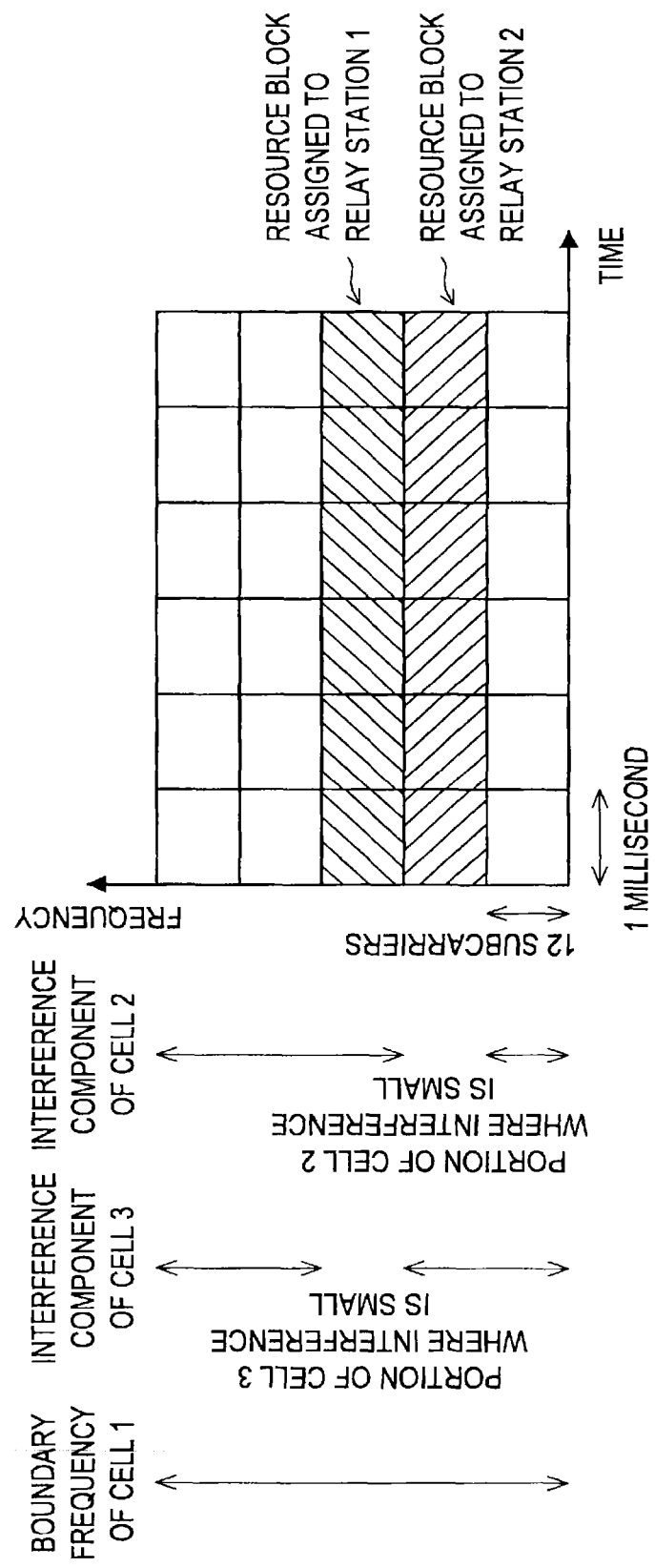
FIG. 16 is a diagram showing a frequency assignment example to relay stations 1 and 2 in Cell 1 in a communication environment shown in FIG. 15A.

FIG. 16 shows a frequency assignment example to the relay station 1 and the relay station 2 in Cell 1. The base station (BS1) of Cell 1 knows positions of the boundary frequency of the local cell that become interference components to the central frequency of each of the adjacent Cell 2 and Cell 3. Thus, the base station of Cell 1 can maintain high quality of user channels by scheduling the relay station 1 and the relay station 2 while avoiding positions that become interference components to the central frequency of each of the adjacent Cell 2 and Cell 3. In the illustrated example, resource blocks with positive slope shading have low interference components to Cell 3 and are assigned to the relay station 1 installed near Cell 3. Resource blocks with negative slope shading have low interference components to Cell 2 and are assigned to the relay station 2 installed near Cell 2.

The base station of Cell 1 notifies Cell 3 closest to the relay station 3 among adjacent cells of information about bands of the boundary frequency of the local cell assigned to the relay station 1 through, for example, a backhaul. Similarly, the base station of Cell 1 notifies Cell 2 closest to the relay station 2 of information about bands assigned to the relay station 2 through a backhaul.

Then, the base station (BS3) of Cell 3 can make an issue of reception by a mobile station inside Cell 3 less likely by scheduling resource blocks in the local cell while avoiding frequency bands (that is, interference components) notified from the base station of Cell 1 and used by the relay station 1 close to the local cell. Similarly, the base station (BS2) of Cell 2 can make an issue of reception by a mobile station inside Cell 2 less likely by scheduling resource blocks in the local cell while avoiding interference components by the relay station 2 close to the local cell.

According to the second method, waste is minimized more than the first method when interference is recognized to be significant in the central frequency of a boundary cell by assigning the frequency in accordance with the position of the relay station.

It has been explaining herein that one system frequency (bandwidth of 20 MHz in LTE) is divided into three sub-carrier blocks, and each sub-carrier block is assigned to a central frequency or a boundary frequency to be used. On the other hand, a method to bind a plurality of bands to communicate may be considered. For example, in case of a communication using a carrier aggregation that communicates in a bandwidth of binding five system frequencies of 20 MHz in each bandwidth, 20 MHz multiplies by 5=100 MHz, the frequency assignment for the central frequency and the boundary frequency in the intercell interference coordination may be performed in a bandwidth of 20 MHz.

Figure 17:
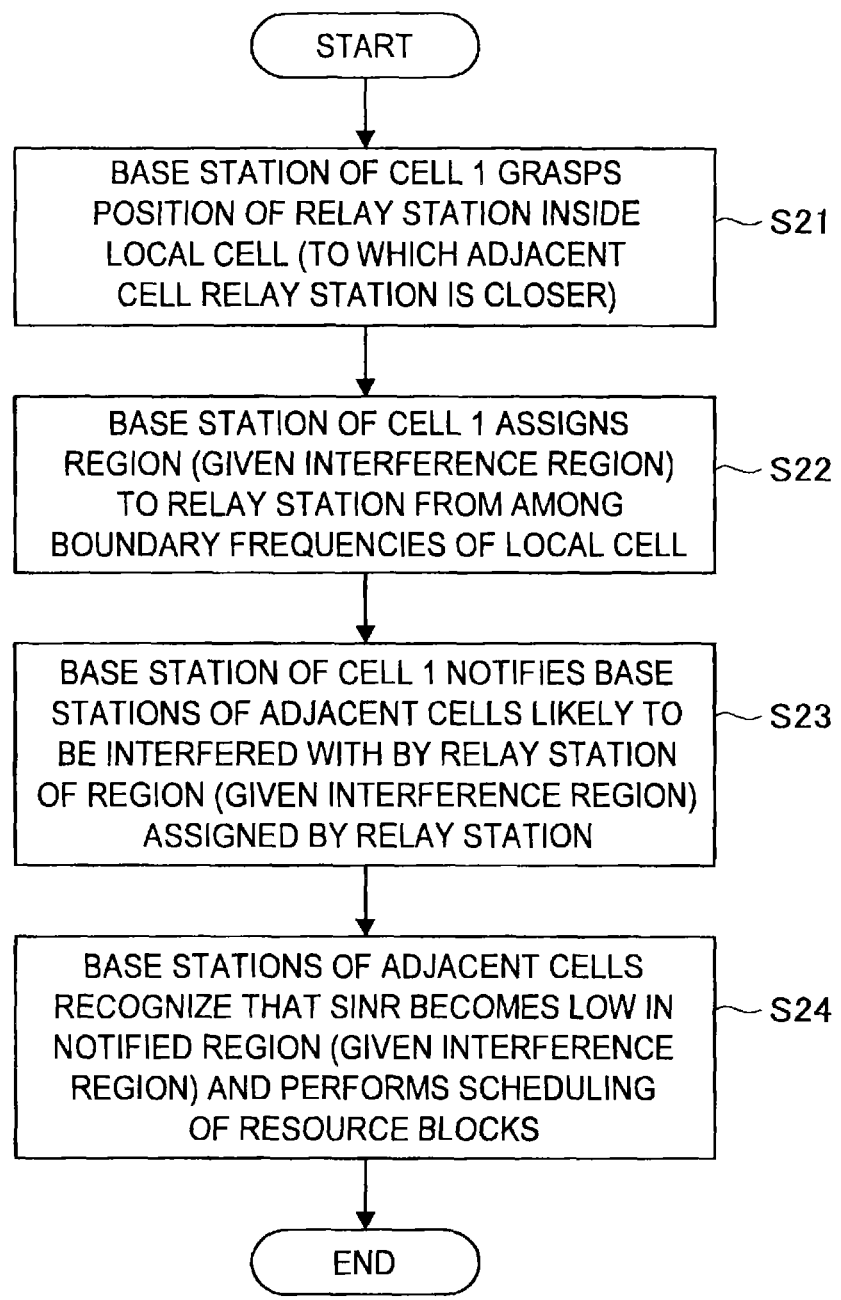
FIG. 17 is a flow chart showing the procedure for system operation to adjust interference with the central frequency of adjacent cells (to realize the second method) by assigning frequency bands according to the position of the relay station.

FIG. 17 shows the procedure for system operation to realize the second method in the form of a flow chart by changing the frequency band to be permitted in accordance with the position of the relay station to adjust interference with the central frequency of adjacent cells.

First, the base station of Cell 1 grasps the position of a relay station installed in the local cell (step S21).

Position information of the relay station can be judged based on, for example, the communication range from the base station. The communication range between communicating stations can be measured from a receiving signal strength indicator (RSSI). Or there may be a method that a GPS (Global Positioning System) is arranged to the relay station so as to notify the base station from the relay station of the measured position information. Since the relay station is not to be moved, when the relay station is set up (built) in a cell, its position information may be registered to a server in the network side. In either way, once the base station obtains the position of each relay station, it determines which adjacent cell each station locates close to. However, the gist of the present invention is not limited to a specific ranging method. Moreover, it is enough to be able to grasp the position of the relay station at such a level that to which adjacent cell the relay station is closer can be grasped.

Next, the base station of Cell 1 decides a region (given interference band) to be used of the boundary frequency of the local cell to the relay station (step S22).

Then, the base station of Cell 1 notifies the base station of the adjacent cell grasped in step S21 and closer to the relay station (that is, more likely to be interfered with) of information about the region (given interference band) assigned to the relay station via, for example, a backhaul (step S23).

The base station of the adjacent cell, on the other hand, can recognize that the region (given interference band) notified from the base station of Cell 1 has a low SINR (Signal to Interference plus Noise Ratio) and schedules resource blocks while avoiding the region of the central frequency of the local cell (step S24).

Figure 18:
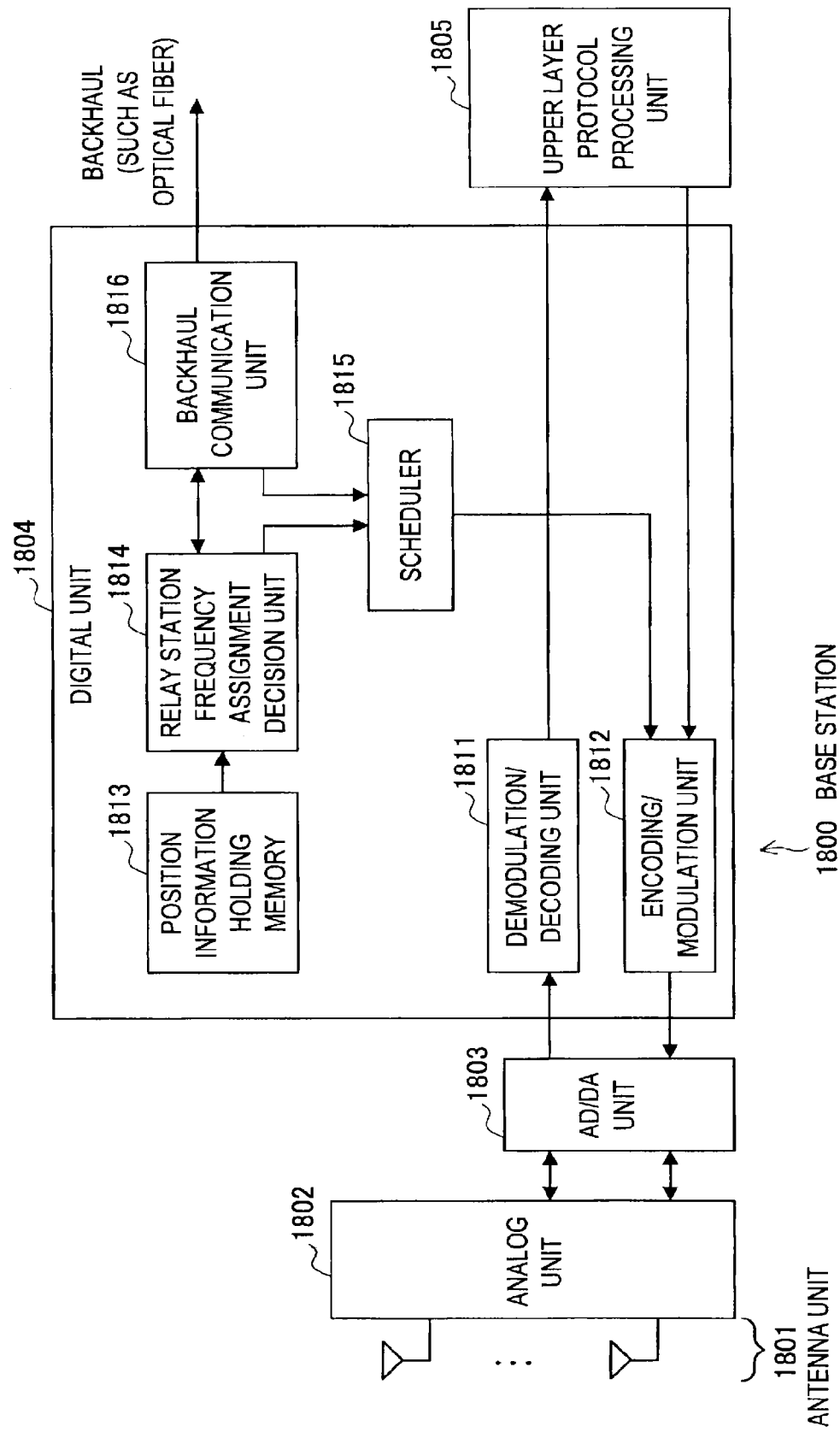
FIG. 18 is a diagram schematically showing the functional configuration for the base station operating in the cellular system according to an embodiment of the present invention to realize the second method according to the processing procedure shown in FIG. 17.

FIG. 18 schematically shows the functional configuration for the base station operating in a cellular system according to the present embodiment to realize the second method according to the processing procedure shown in FIG. 17. An illustrated base station 1800 is constituted by an antenna unit 1801, an analog unit 1802 that performs analog processing of a transmission/reception signal, an AD/DA processing unit 1803 that performs digital conversion of an analog reception signal or analog conversion of a digital transmission signal, a digital unit 1804 that performs digital processing of a transmission/reception signal, and an upper layer protocol processing unit 1805 that performs a data transmission request, reception data processing and the like.

The base station 1800 has, for example, a plurality of antenna elements as the antenna unit 1801 and may adopt the space division multiple access scheme (same as above), but the gist of the present invention is not limited to this. The upper layer protocol processing unit 1805 can also be constituted as a general computer system such as a personal computer (same as above).

The digital unit 1804 includes, in addition to a demodulation/decoding unit 1811 that performs demodulation and decoding processing of a reception signal and an encoding/modulation unit 1812 that performs encoding and modulation processing of a transmission signal, functional modules such as a position information holding memory 1813, a relay station frequency assignment decision unit 1814 that makes a decision about frequency assignment to relay stations in the local cell, a scheduler 1815 that manages, that is, schedules radio resources in the local cell, and a backhaul communication unit 1816 that performs communication with base stations of other cells through a backhaul constituted by optical fibers or the like. The functional modules 1813 to 1815 can be constituted by dedicated hardware, but can also be realized by a predetermined software program being executed by a processor.

The position information holding memory 1813 has position information of each relay station belonging to the local cell and position information of adjacent cells stored therein. Position information of a relay station can be judged based on, for example, the communication range from the base station 1800. The communication range between communicating stations can be measured from the receiving signal strength indicator. A notification of position information of an adjacent cell may be received from the base station of the adjacent cell via a backhaul.

If the relay station frequency assignment decision unit 1814 identifies or estimates an adjacent cell close to the relay station (that is, more likely to be interfered with) based on position information of relay stations and adjacent cells stored in the position information holding memory 1813, the relay station frequency assignment decision unit 1814 decides a region (given interference band) to be used by the relay station from among the boundary frequencies of the local cell while avoiding a region likely to interfere with the central frequency on the adjacent cell side. Then, information about the decided region (given interference band) is transmitted to the base station of the adjacent cell through the backhaul communication unit 1816.

The scheduler 1815 assigns, that is, schedules radio resources in the local cell conforming to the region assigned to the relay station by the relay station frequency assignment decision unit 1814. When a given interference band is notified from the base station of an adjacent cell through the backhaul, the scheduler 1815 assigns the central frequency of the local cell while avoiding given interference band of the adjacent cell. The minimum unit of scheduling is the resource block.

On the other hand, functional configurations of the relay station and the mobile stations may be the same as those shown in FIGS. 13 and 14 respectively and thus, a description thereof is omitted.

It should be understood that, by setting the frequency band permitted in accordance with the position of a relay station between adjacent cells constituted by arranging the base station 1200, the relay station 1300, and the mobile station 1400 shown in FIGS. 18, 13, and 14 respectively, interference with the central frequency of adjacent cells by a signal of the boundary frequency transmitted from the relay station can be adjusted, contributing to improvement of throughput for the user.

The example shown in FIG. 15A assumes a communication environment in which three Cells 1 to 3 that perform the fractional frequency repetition are adjacent to each other. That is, a case when a schedule is planned while taking interference with the adjacent Cell 2 and Cell 3 by Cell 1 into consideration is considered as the second method.

However, the above description does not consider, when Cell 1 assigns the boundary frequency to, for example, the relay station 2 close to the adjacent Cell 2, which boundary frequency to assign at all in other cells (not shown in FIG. 15A) adjacent to Cell 2. This also applies when Cell 1 assigns the boundary frequency to, for example, the relay station 1 close to the adjacent Cell 3.

As described above with reference to FIG. 16, Cell 2 assigns the central frequency of the local cell while avoiding the given interference band notified from the adjacent Cell 1. In an actual cellular system, Cell 2 is in most cases in contact with adjacent cells all around cell edges. While the base station of Cell 2 assigns the central frequency of the local cell by avoiding given interference bands of all adjacent cells, if the given interference band is different from adjacent cell to adjacent cell, the total width of frequency bands that should be avoided increases, lowering the efficiency of frequency utilization.

Thus, it is desirable to prevent an extra increase of given interference bands to adjacent cells by assigning the boundary frequency to the relay station through mutual collaboration of cells adjacent to the same cell.

A method of adjusting interference with the central frequency of the same adjacent cell with a high degree of efficiency of frequency utilization by scheduling radio resources through mutual collaboration of cells adjacent to the same cell will be considered below with reference to FIG. 19.

Figure 19:
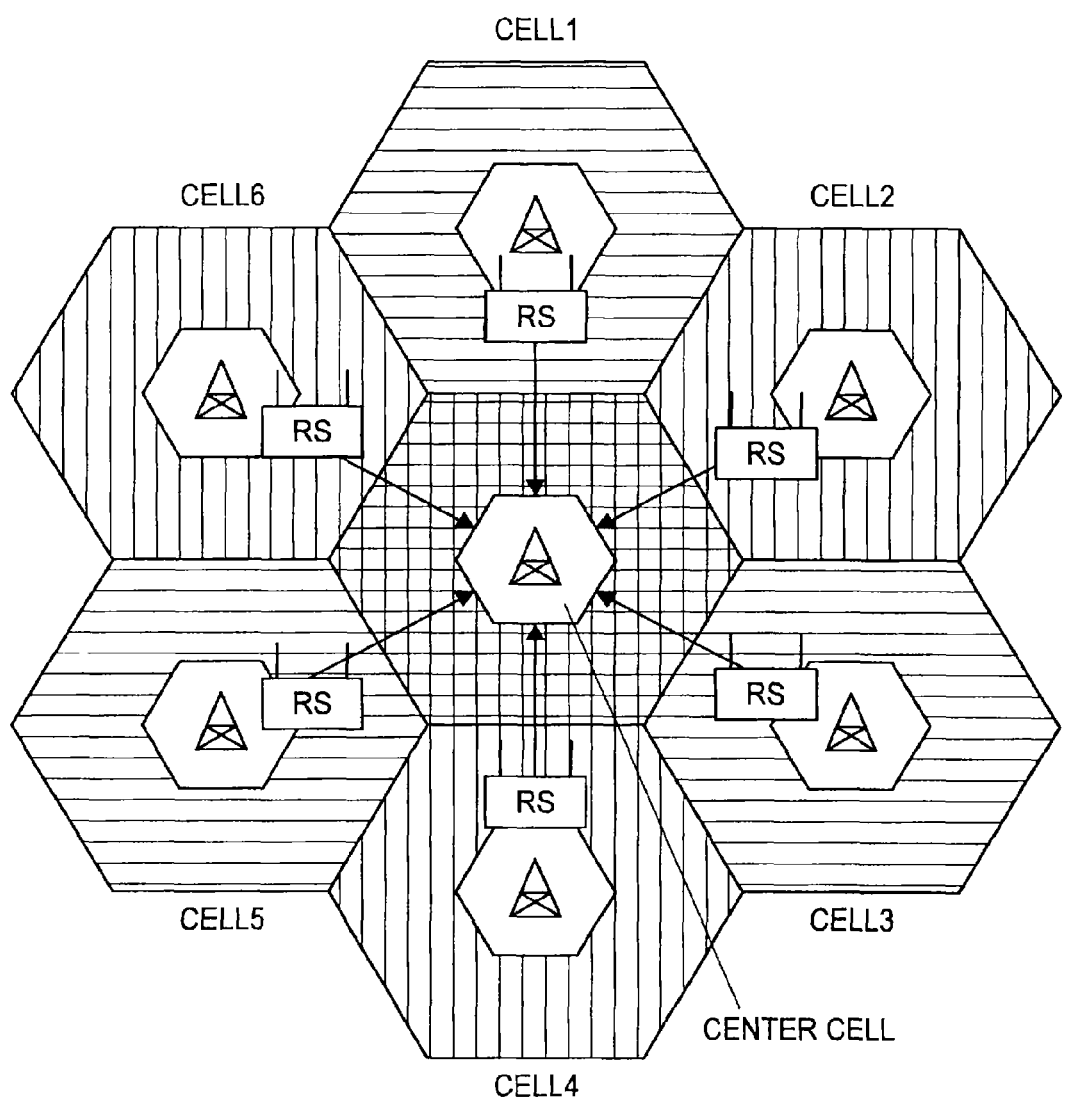
FIG. 19 is a diagram showing how six Cells 1 to 6 performing the fractional frequency repetition are adjacent to each other (a diagram to illustrate a second method of adjusting interference with the central frequency of adjacent cells by assigning frequency bands according to the position of the relay station while mutually collaborating with cells adjacent to the same cell).

In FIG. 19, the cell to be focused is assumed to be the center cell arranged in the center. Each side of cell edges composed of a hexagon of the center cell is adjacent to each of six Cells 1 to 6. The 3-cell frequency repetition is applied to the boundary frequency and differences in frequency are represented by shading in FIG. 19. The boundary region of the center cell has grid line shading and, on the other hand, the boundary region of adjacent Cells 1, 3, and 5 has horizontal stripe shading and the boundary region of adjacent Cells 2, 4, and 6 vertical stripe shading to avoid interference at cell edges.

It is necessary for the base station of the center cell to assign the central frequency of the local cell while avoiding given interference bands notified from all the adjacent Cells 1 to 6. If a plurality of adjacent cells that has the same boundary frequency assigns the same frequency band (given interference band) to a relay station close to the center cell, the center cell needs to assign the central frequency by avoiding only the given interference band. That is, the (restricted) band width that interferes with the central frequency of the center cell can be reduced to a minimum so that frequency utilization becomes more efficient.

Based on a difference of the boundary frequency, the six Cells 1 to 6 can be divided into two groups: three cells with vertical stripe shading in the boundary regions (that is, a common band is assigned to the boundary frequencies) and three cells with horizontal stripe shading in the boundary regions (that is, a common band is assigned to the boundary frequencies). For example, when performing the frequency assignment shown in FIG. 15B in the central cell, a frequency assignment shown in FIG. 15c is executed in a first group composed of the adjacent Cells 1, 3, and 5 with horizontal stripe shading in the boundary region, and a frequency assignment shown in FIG. 15d is executed in a second group composed of the adjacent Cells 2, 4, and 6 with vertical stripe shading in the boundary region. (Instead, it may be appropriate if the first group executes a frequency assignment shown in FIG. 15D is executed, and the second group executes a frequency assignment shown in FIG. 15C.) Here, in a first group composed of the adjacent Cells 1, 3, and 5, among the frequency regions which is a central frequency of the central cell (that is, adjacent cell to be common in the first group) and the boundary frequency of the group, a common frequency region to be assigned to the relay station arranged close to the central cell is determined, and this becomes a first given interference band for the center cell. Similarly, in a second group composed of the adjacent Cells 2, 4, and 6, among the frequency regions which is a central frequency of the central cell (that is, adjacent cell to be common in the second group) and the boundary frequency of the group, a common frequency region to be assigned to the relay station arranged close to the central cell is determined, and becomes a second given interference band for the center cell.

Figure 20:
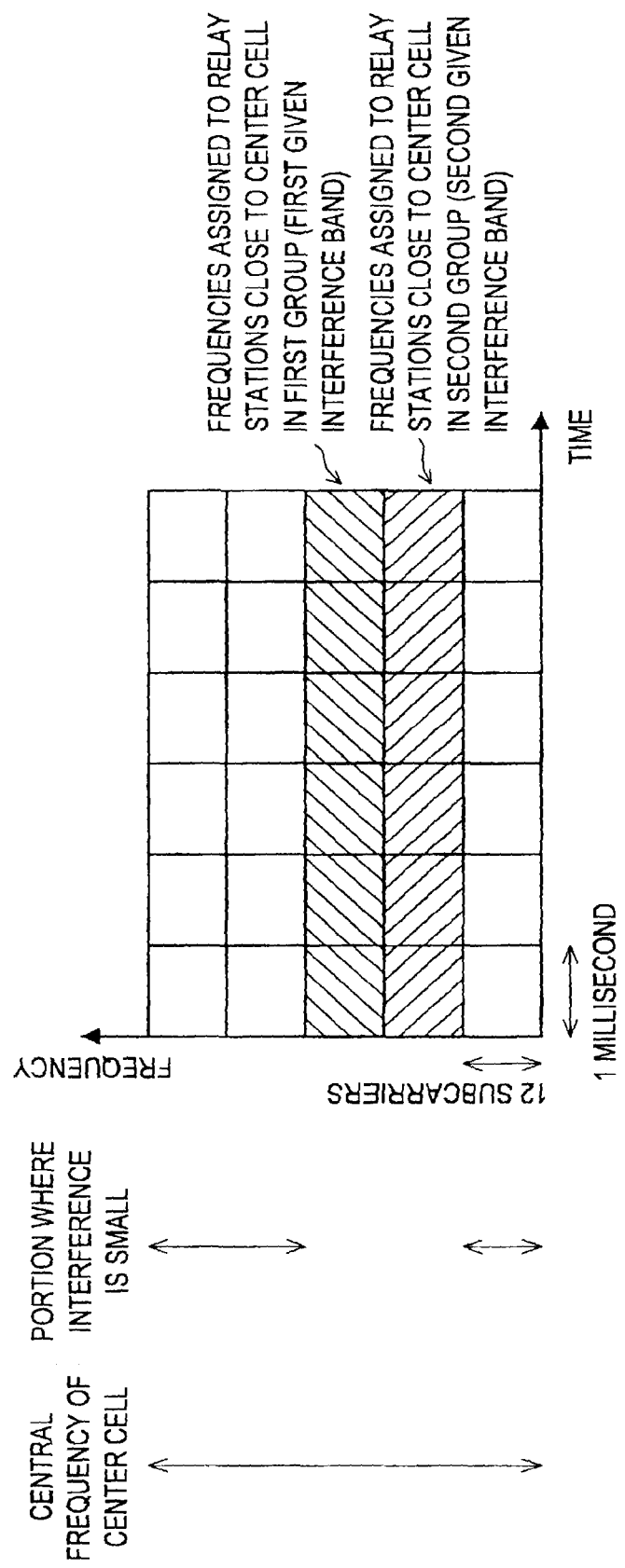
FIG. 20 is a diagram showing an assignment example of the central frequency of a center cell when assigned a same given interference band to the relay station close to the central cell for each group of a plurality of adjacent cells that has the same boundary frequency in the communication environment shown in FIG. 19.

FIG. 20 shows an assignment example of the central frequency of the center cell when in the cell environment shown in FIG. 19, the same given interference band is assigned to the relay station close to the central cell for each group of a plurality of adjacent cells that has the same boundary frequency. As illustrated, the base station of the center cell may assign the central frequency by avoiding only the first given interference band and the second given interference band. It can be understood from the illustration that the band width that interferes with the central frequency of the center cell can be reduced to a minimum so that frequency utilization becomes more efficient.

Figure 21:
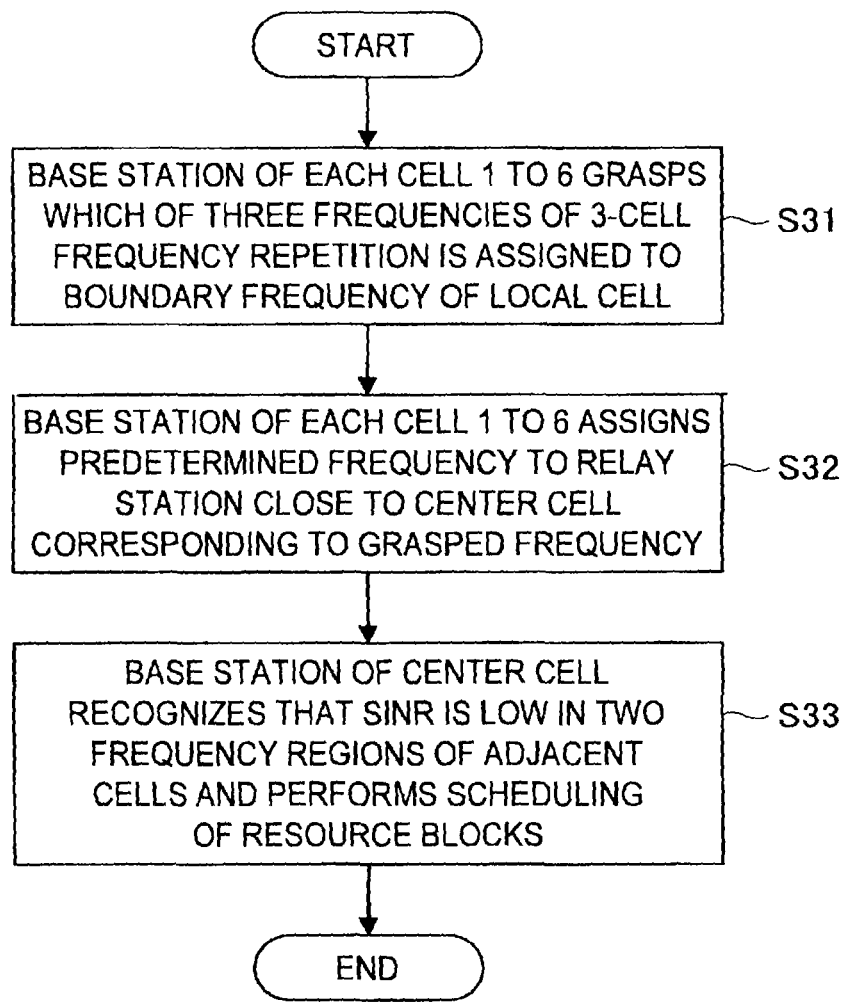
FIG. 21 is a flow chart showing the procedure for system operation to adjust interference with the central frequency of adjacent cells (to realize the second method) by assigning frequency bands according to the position of the relay station while mutually collaborating with cells adjacent to the same cell.

FIG. 21 shows the procedure for system operation to realize the second method by assigning the frequency band in accordance with the position of the relay station to adjust interference with the central frequency of adjacent cells while cells adjacent to the same cell mutually collaborate in the form of a flow chart.

First, the base station of each of Cells 1 to 6 adjacent to the center cell grasps which of three frequencies of the 3-cell frequency repetition is the frequency assigned to the boundary frequency of the local cell (step S31).

Next, the base station of each of Cells 1 to 6 assigns a frequency among the boundary frequencies that is a central frequency of the central cell and the boundary frequency of the local cell to a relay station near the center cell (step S32).

As described above, the adjacent Cells 1 to 6 are classified into two groups. In a first group composed of the adjacent Cells 1, 3, and 5, each base station determines a common frequency region to assign to a relay station close to the central cell among the frequency regions that is the central frequency of the central cell and the boundary frequency of the group. Meanwhile, in a second group composed of the adjacent Cells 2, 4, and 6, each base station determines a common frequency region to assign to a relay station close to the central cell among the frequency regions that is the central frequency of the central cell and the boundary frequency of the group. As a result, two given interference bands arise for the central frequency of the center cell.

Then, the base station of the center cell recognizes that the region corresponding to the two given interference bands from adjacent cells has a low SINR and schedules resource blocks while avoiding the region of the central frequency of the local cell (step S33).

Figure 22:
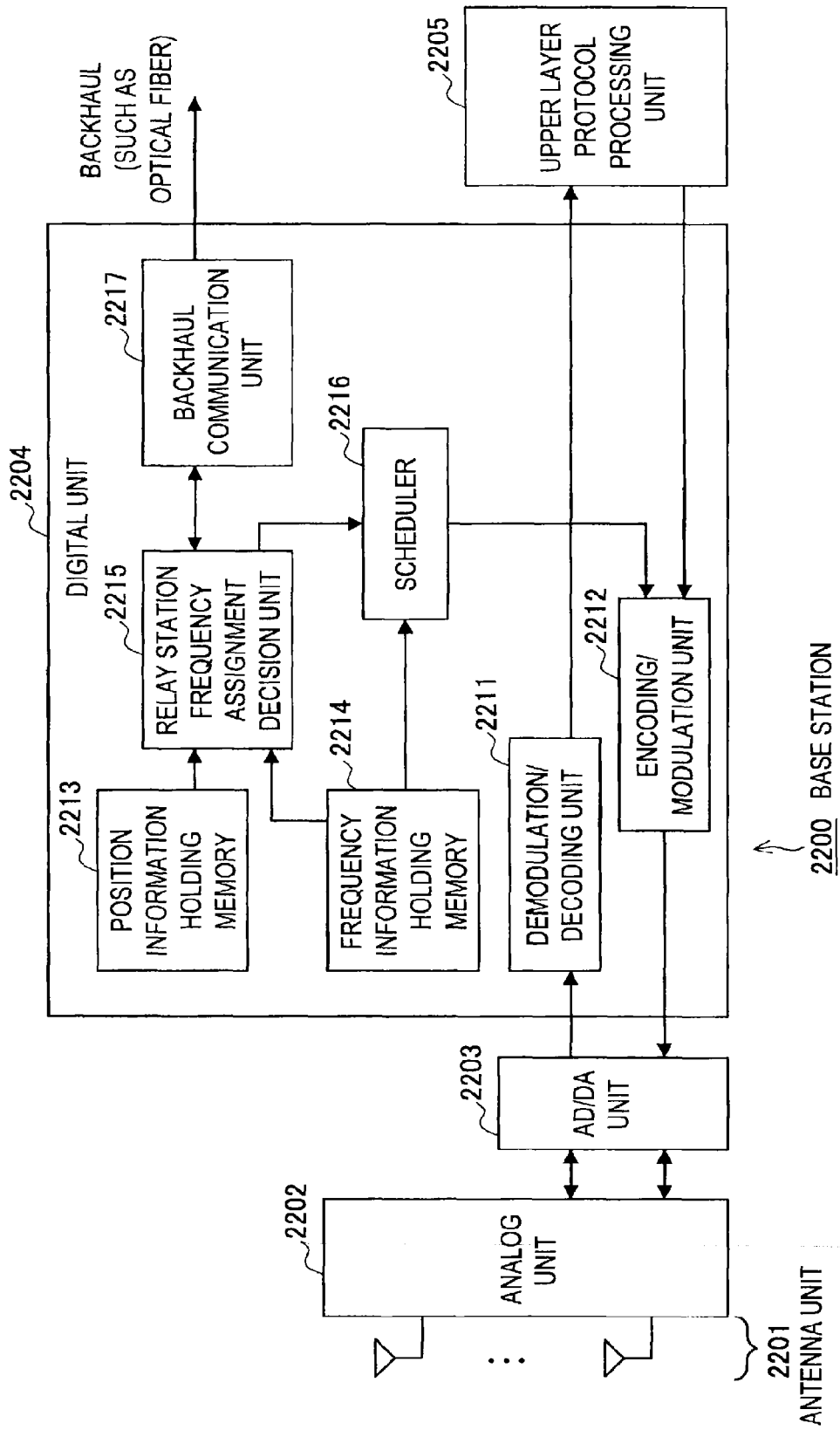
FIG. 22 is a diagram schematically showing the functional configuration for the base station operating in the cellular system according to an embodiment of the present invention to realize the second method according to the processing procedure shown in FIG. 21.

FIG. 22 schematically shows the functional configuration for the base station operating in a cellular system according to the present embodiment to realize the second method according to the processing procedure shown in FIG. 21. An illustrated base station 2200 is constituted by an antenna unit 2201, an analog unit 2202 that performs analog processing of a transmission/reception signal, an AD/DA processing unit 2203 that performs digital conversion of an analog reception signal or analog conversion of a digital transmission signal, a digital unit 2204 that performs digital processing of a transmission/reception signal, and an upper layer protocol processing unit 2205 that performs a data transmission request, reception data processing and the like.

The base station 2200 has, for example, a plurality of antenna elements as the antenna unit 2201 and may adopt the space division multiple access scheme (same as above), but the gist of the present invention is not limited to this. The upper layer protocol processing unit 2205 can also be constituted as a general computer system such as a personal computer (same as above).

The digital unit 2204 includes, in addition to a demodulation/decoding unit 2211 that performs demodulation and decoding processing of a reception signal and an encoding/modulation unit 2212 that performs encoding and modulation processing of a transmission signal, functional modules such as a position information holding memory 2213, a frequency information holding memory 2214, a relay station frequency assignment decision unit 2215 that makes a decision about frequency assignment to relay stations in the local cell, a scheduler 2216 that manages, that is, schedules radio resources in the local cell, and a backhaul communication unit 2217 that performs communication with base stations of other cells through a backhaul constituted by optical fibers or the like. The functional modules 2213 to 2216 can be constituted by dedicated hardware, but can also be realized by a predetermined software program being executed by a processor.

The position information holding memory 2213 has position information of each relay station belonging to the local cell and position information of adjacent cells stored therein. Position information of a relay station can be judged based on, for example, the communication range from the base station 2200. The communication range between communicating stations can be measured from the receiving signal strength indicator. A notification of position information of an adjacent cell may be received from the base station of the adjacent cell via a backhaul.

The frequency information holding memory 2214 has the boundary frequency used by the local cell and which of three frequencies of the 3-cell frequency repetition is the boundary frequency of each cell adjacent to the local cell stored therein.

The relay station frequency assignment decision unit 2215 decides a frequency to be assigned to a relay station installed in the local cell. The relay station frequency assignment decision unit 2215 first identifies or estimates an adjacent cell close to the relay station (that is, more likely to interfere) based on position information of relay stations and adjacent cells by referring to information of the boundary frequency stored in the position information holding memory 2213. Subsequently, after boundary frequencies of the local cell and central frequencies of its adjacent cells thereof being fetched from the frequency information holding memory 2214, a frequency to be assigned to the relay station is determined among the boundary frequencies that is the central frequency of the adjacent cell and the boundary frequency of the local cell (corresponding to processing of the adjacent Cells 1 to 6 in FIG. 19). Note that the method to obtain the position information of the relay station is as described above.

The scheduler 2216 assigns, that is, schedules radio resources in the local cell conforming to the region assigned to the relay station by the relay station frequency assignment decision unit 2215. After the restricted band of the local cell and the given interference band from the adjacent cells being fetched from the frequency information holding memory 2214, the scheduler 2216 plans a schedule about the central frequency and the boundary frequency of the local cell while avoiding such a band (corresponding to processing as the center cell in FIG. 19).

On the other hand, functional configurations of the relay station and the mobile stations may be the same as those shown in FIGS. 13 and 14 respectively and thus, a description thereof is omitted.

It should be understood that, by assigning the frequency band in accordance with the position of a relay station between adjacent cells constituted by arranging the base station 2200, the relay station 1300, and the mobile station 1400 shown in FIGS. 22, 13, and 14 respectively, interference with the central frequency of adjacent cells by a signal of the boundary frequency transmitted from the relay station can be adjusted, contributing to improvement of throughput for the user.

INDUSTRIAL APPLICABILITY

In the foregoing, the present invention has been described in detail with reference to specific embodiments. However, it is self-evident that persons skilled in the art can modify or replace such embodiments without deviating from the gist of the present invention.

Herein, the description has focused on embodiments obtained by applying the present invention to a mobile communication system, but the gist of the present invention is not limited to this. The present invention can similarly be applied to various communication systems including wireless LANs in which a base station and a mobile station communicate through the mediation of a relay station.

In summary, the present invention has been disclosed in the form of exemplification and content described herein should not be interpreted restrictively. Claims should be considered for judging the gist of the present invention.

REFERENCE SIGNS LIST

1200 Base station
1201 Antenna unit
1202 Analog unit
1203 AD/DA processing unit
1204 Digital unit
1205 Upper layer protocol processing unit
1211 Demodulation/decoding unit
1212 Encoding/modulation unit
1213 Relay station frequency assignment decision unit
1214 Scheduler
1215 Backhaul communication unit
1300 Relay station
1301 Antenna unit
1302 Analog unit
1303 AD/DA processing unit
1304 Digital unit
1311 Synchronization unit
1312 Demodulation/decoding unit
1313 Encoding/modulation unit
1314 Buffer
1315 Transmission/reception control unit
1316 Scheduling information holding memory
1317 CPU
1400 Mobile station
1401 Antenna unit
1402 Analog unit
1403 AD/DA processing unit
1404 Digital unit
1405 Upper layer protocol processing unit
1411 Synchronization unit
1412 Demodulation/decoding unit
1413 Encoding/modulation unit
1414 Scheduling information holding memory
1415 CPU
1800 Base station
1801 Antenna unit
1802 Analog unit
1803 AD/DA processing unit
1804 Digital unit
1805 Upper layer protocol processing unit
1811 Demodulation/decoding unit
1812 Encoding/modulation unit
1813 Position information holding memory
1814 Relay station frequency assignment decision unit
1815 Scheduler
1816 Backhaul communication unit
2200 Base station
2201 Antenna unit
2202 Analog unit
2203 AD/DA processing unit
2204 Digital unit
2205 Upper layer protocol processing unit
2211 Demodulation/decoding unit
2212 Encoding/modulation unit
2213 Position information holding memory
2214 Frequency information holding memory
2215 Relay station frequency assignment decision unit
2216 Scheduler
2217 Backhaul communication unit

The invention claimed is:

1. A base station in a first cell, the base station comprising:
a position information holding circuit that stores first position information of each relay station in the first cell;
a backhaul communication circuit that receives second position information of each relay station in a second cell from a second base station in the second cell, the position information holding circuit storing the second position information of each relay station in the second cell;
a relay station frequency assignment circuit that assigns frequency bands for each relay station of the first cell in accordance with the first position information and the second position information;
a notification circuit that notifies the second base station in the second cell of interference information that includes at least a level of interference from the second cell, a level of power for managing radio resources, or the determined frequency bands; and
a scheduling circuit that schedules the radio resources in the first cell according to the interference information, wherein
each of the first cell and the second cell include a center region and a boundary region.

2. The base station according to claim 1, wherein the first cell is adjacent to the second cell.

3. The base station according to claim 2, wherein each center region uses a central frequency and each boundary region uses a boundary frequency.

4. The base station according to claim 3, wherein each of the first cell and the second cell permits installation of a relay station that relays communication between a base station and a mobile station.

5. The base station according to claim 4, wherein
an assignment to the relay station in the first cell is restricted to a restricted band on the first cell side, and
a frequency to the mobile station in the second cell is assigned by avoiding the restricted band or by lowering a degree of priority on the second cell side.

6. The base station according to claim 4, wherein
the notification circuit notifies the second base station of a restricted band, and
the scheduling circuit schedules the radio resources while conforming to the restricted band.

7. The base station according to claim 6, further comprising a relay station frequency assignment decision circuit that decides the restricted band of boundary frequencies to be assigned to the relay station.

8. The base station according to claim 6, wherein when the second base station is notified of the restricted band, the scheduling circuit assigns a central frequency of the first cell by avoiding the restricted band of the adjacent cell or lowering an order of priority thereof.

9. A communication method, performed by a base station in a first cell, the communication method comprising:
storing, by a position information holding circuit, first position information of each relay station in the first cell;
receiving, by backhaul communication circuit, second position information of each relay station in a second cell from a second base station in the second cell;

storing, by the position information holding circuit, the second position information of each relay station of the second cell;

assigning, by a relay station frequency assignment circuit, frequency bands for each relay station of the first cell in accordance with the first position information and the second position information;

notifying, by a notification circuit of the base station, the second base station in the second cell of interference information that includes at least a level of interference from the second cell, a level of power for managing radio resources, or the determined frequency bands; and scheduling, by a scheduling circuit of the base station, the radio resources in the first cell according to the interference information, wherein each of the first cell and the second cell include a center region and a boundary region.

10. The communication method according to claim 9, wherein the first cell is adjacent to the second cell, and each center region uses a central frequency and each boundary region uses a boundary frequency.

11. The communication method according to claim 10, wherein each of the first cell and the second cell permits installation of a relay station that relays communication between a base station and a mobile station.

12. The communication method according to claim 11, further comprising:

restricting an assignment, to the relay station in the first cell, to a restricted band on the first cell side, and assigning a frequency to the mobile station in the second cell by avoiding the restricted band or by lowering a degree of priority on the second cell side.

13. The communication method according to claim 12, further comprising deciding the restricted band of boundary frequencies to be assigned to the relay station.

14. The communication method according to claim 12, further comprising:

when the second base station is notified of the restricted band, the scheduling circuit assigns a central frequency of the first cell by avoiding the restricted band of the adjacent cell or lowering an order of priority thereof.

15. A non-transitory computer readable medium storing computer readable instructions that, when executed by a base station in a first cell, the base station including circuitry, causes the base station to:

store first position information of each relay station in the first cell;

receive second position information of each relay station in a second cell from a second base station in the second cell;

store the second position information of each relay station in the second cell;

assign frequency bands for each relay station of the first cell in accordance with the first position information and the second position information;

notify the second base station in the second cell of interference information that includes at least a level of interference from the second cell, a level of power for managing radio resources, or the determined frequency bands; and schedule the radio resources in the first cell according to e interference information, wherein each of the fir t cell and he second cell include a center region and a boundary region.

16. The non-transitory computer readable medium according to claim 15, wherein the first cell is adjacent to the second cell, and each center region uses a central frequency and each boundary region uses a boundary frequency.

17. The non-transitory computer readable medium according to claim 16, wherein each of the first cell and the second cell permits installation of a relay station that relays communication between a base station and a mobile station.

18. The non-transitory computer readable medium according to claim 17, wherein an assignment to the relay station in the first cell is restricted to a restricted band on the first cell side, and a frequency to the mobile station in the second cell is assigned by avoiding the restricted band or by lowering a degree of priority on the second cell side.

19. The non-transitory computer readable medium according to claim 17, wherein the base station is further caused to:

notify the second base station of a restricted band; and schedule the radio resources while conforming to the restricted band.

* * * * *